(12) United States Patent
Fan et al.

(10) Patent No.: US 9,798,774 B1
(45) Date of Patent: Oct. 24, 2017

(54) GRAPH DATA SEARCH METHOD AND APPARATUS

(71) Applicant: Huawei Technologies Co., Ltd., Shenzhen (CN)

(72) Inventors: Wenfei Fan, Edinburgh (GB); Xin Wang, Chengdu (CN); Yinghui Wu, Santa Barbara, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/618,587

(22) Filed: Jun. 9, 2017

Related U.S. Application Data

(63) Continuation of application No. PCT/CN2015/096845, filed on Dec. 9, 2015.

(30) Foreign Application Priority Data

Dec. 9, 2014 (CN) .......................... 2014 1 0751268

(51) Int. Cl.
*G06F 7/02* (2006.01)
*G06F 17/30* (2006.01)

(52) U.S. Cl.
CPC .. *G06F 17/30454* (2013.01); *G06F 17/30545* (2013.01); *G06F 17/30864* (2013.01); *G06F 17/30958* (2013.01); *G06F 17/30979* (2013.01)

(58) Field of Classification Search
CPC ......... G06F 17/30958; G06F 17/30864; G06F 17/30436; G06F 17/30277; G06F 17/30545; G06F 17/30327
See application file for complete search history.

(56) References Cited

U.S. PATENT DOCUMENTS

| | | | |
|---|---|---|---|
| 8,316,060 B1 | 11/2012 | Snyder, II et al. | |
| 2013/0016116 A1* | 1/2013 | Simon ................... | G06T 11/206 345/589 |

(Continued)

FOREIGN PATENT DOCUMENTS

| | | |
|---|---|---|
| CN | 102332009 A | 1/2012 |
| CN | 102521332 A | 6/2012 |

(Continued)

OTHER PUBLICATIONS

Machine Translation and Abstract of Chinese Publication No. CN104504003, Apr. 8, 2015, 36 pages.

(Continued)

*Primary Examiner* — Bruce Moser
(74) *Attorney, Agent, or Firm* — Conley Rose, P.C.

(57) ABSTRACT

A graph data search method and apparatus, where the method includes obtaining a query request including a query condition that carries a start graph node, the query request queries a first to-be-queried graph node matching the query condition from a graph data set, and the graph data set includes the start graph node, a plurality of to-be-queried graph nodes, an association relationship between the start graph node and the plurality of graph nodes, and an association relationship between each to-be-queried graph node and another graph node, filtering out, according to the query condition and a preset available resource condition, a second to-be-queried graph node that does not meet the query condition and an association relationship in the graph data set that includes the second to-be-queried graph node, and performing a query in the reduction subgraph using the query condition.

20 Claims, 13 Drawing Sheets

(56) References Cited

U.S. PATENT DOCUMENTS

| | | | | |
|---|---|---|---|---|
| 2014/0136520 | A1* | 5/2014 | Digana | G06F 17/30958 707/722 |
| 2014/0137130 | A1* | 5/2014 | Jacob | G06F 9/46 718/103 |
| 2014/0172914 | A1* | 6/2014 | Elnikety | G06F 17/30979 707/774 |
| 2015/0186653 | A1* | 7/2015 | Gkoulalas-Divanis | G06F 17/30371 726/26 |
| 2016/0019228 | A1* | 1/2016 | Hong | G06F 17/30958 707/624 |

FOREIGN PATENT DOCUMENTS

| | | |
|---|---|---|
| CN | 102662974 A | 9/2012 |
| CN | 102819536 A | 12/2012 |
| CN | 103377236 A | 10/2013 |
| CN | 104504003 A | 4/2015 |

OTHER PUBLICATIONS

Machine Translation and Abstract of Chinese Publication No. CN103377236, Oct. 30, 2013, 18 pages.

Machine Translation and Abstract of Chinese Publication No. CN102819536, Dec. 12, 2012, 12 pages.

Machine Translation and Abstract of Chinese Publication No. CN102662974, Sep. 12, 2012, 9 pages.

Machine Translation and Abstract of Chinese Publication No. CN102521332, Jun. 27, 2012, 13 pages.

Machine Translation and Abstract of Chinese Publication No. CN102332009, Jan. 25, 2012, 8 pages.

Cohen, E., et al., "Reachability and distance queries via 2-hop labels," SODA '02 Proceedings of the thirteenth annual ACM-SIAM symposium on Discrete algorithms, Jan. 6-8, 2002, 10 pages.

Fan, W., et al., "Querying Big Graphs within Bounded Resources," SIGMOD, Jun. 22-27, 2014, 12 pages.

Fan, W., et al., "Querying Big Data: Bridging Theory and Practice," Aug. 6, 2014, 17 pages.

Navlakha, S., et al., "Graph Summarization with Bounded Error," SIGMOD, Jun. 9-12, 2008, 13 pages.

Agarwal, S., et al., "BlinkDB: Queries with Bounded Errors and Bounded Response Times on Very Large Data," Eurosys, Apr. 15-17, 2013, 14 pages.

Foreign Communication From a Counterpart Application, PCT Application No. PCT/CN2015/096845, English Translation of International Search Report dated Mar. 8, 2016, 2 pages.

Foreign Communication From a Counterpart Application, PCT Application No. PCT/CN2015/096845, English Translation of Written Opinion dated Mar. 8, 2016, 7 pages.

* cited by examiner

GRAPH DATA SEARCH METHOD AND APPARATUS

CROSS-REFERENCE TO RELATED APPLICATIONS

This application is a continuation of International Patent Application No. PCT/CN2015/096845 filed on Dec. 9, 2015, which claims priority to Chinese Patent Application No. 201410751268.9 filed on Dec. 9, 2014. The disclosures of the aforementioned applications are hereby incorporated by reference in their entireties.

TECHNICAL FIELD

Embodiments of the present disclosure relate to computer technologies, and in particular, to a graph data search method and apparatus.

BACKGROUND

With continuous development of computer technologies, an increasing amount of data is processed by a computer. A current big data era is also an era in which graph data prosperously develops. The graph data herein is data that has an association relationship with each other. On the basis of this, the computer usually needs to perform full big data analysis, and a large quantity of time resources and storage resources of the computer are consumed to obtain a precise search result.

To avoid resource consumption caused in a conventional search mechanism, a data sampling-based query (BlinkDB) technology is proposed in the other approaches. Original graph data is continuously sampled using a specific sampling algorithm, and a graph data sample is established and maintained in order to obtain a corresponding search result.

However, additional storage overheads need to be used to maintain the graph data sample in the BlinkDB technology in the other approaches. Consequently, storage resources of the computer are wasted to a great extent.

SUMMARY

Embodiments of the present disclosure provide a graph data search method and apparatus such that a resource waste caused during a graph data search is avoided while a graph data search is effectively performed.

According to a first aspect, an embodiment of the present disclosure provides a graph data search method, including obtaining a query request, where the query request includes a query condition that carries a start graph node, the query request is used to query a first to-be-queried graph node that is in a graph data set and that matches the query condition, and the graph data set includes the start graph node, multiple to-be-queried graph nodes, an association relationship between the start graph node and the multiple to-be-queried graph nodes, and an association relationship between each to-be-queried graph node and another to-be-queried graph node in the multiple to-be-queried graph nodes, filtering out, according to the query condition and a preset available resource condition, a second to-be-queried graph node that is in the graph data set and that does not meet the query condition and an association relationship that is in the graph data set and that includes the second to-be-queried graph node in order to obtain a reduction subgraph, where the reduction subgraph includes the start graph node, the first to-be-queried graph node that matches the query condition, and an association relationship between the start graph node and the first to-be-queried graph node, and performing a query in the reduction subgraph using the query condition in order to obtain the first to-be-queried graph node.

With reference to the first aspect, in a first possible implementation manner of the first aspect, filtering out, according to the query condition and a preset available resource condition, a second to-be-queried graph node that is in the graph data set and that does not meet the query condition and a corresponding association relationship that is in the graph data set and that includes the second to-be-queried graph node in order to obtain a reduction subgraph includes generating a query topology structure according to the query condition, where the query topology structure includes multiple query nodes and a query topology relationship between each query node and another query node in the multiple query nodes, and filtering out, according to the query topology relationship between the query nodes in the query topology structure, a preset first access cost of accessing the first to-be-queried graph node, and the available resource condition, the second to-be-queried graph node that is in the graph data set and whose access cost exceeds the first access cost and the association relationship that is in the graph data set and that includes the second to-be-queried graph node in order to obtain the reduction subgraph, where a resource occupied by the reduction subgraph does not exceed the available resource condition.

With reference to the first possible implementation manner of the first aspect, in a second possible implementation manner of the first aspect, filtering out, according to the query topology relationship between the query nodes in the query topology structure, a preset first access cost of accessing the first to-be-queried graph node, and the available resource condition, the second to-be-queried graph node that is in the graph data set and whose access cost exceeds the first access cost and the association relationship that is in the graph data set and that includes the second to-be-queried graph node in order to obtain the reduction subgraph includes reading a query node and a graph node matching the query node that are stored in storage space, where a query node in the query topology structure and a graph node matching the query node are stored in the storage space, the query node includes a start query node, the graph node includes the start graph node or the to-be-queried graph node, and the start graph node matches the start query node, determining whether the reduction subgraph includes the read graph node, adding the read graph node to the reduction subgraph, and determining that the resource occupied by the reduction subgraph does not exceed the available resource condition if the reduction subgraph does not include the read graph node, and calculating an access cost of a to-be-queried graph node adjacent to the read graph node, filtering out the second to-be-queried graph node whose access cost exceeds the first access cost and the association relationship that includes the second to-be-queried graph node whose access cost exceeds the first access cost, according to the query topology relationship between the query nodes in the query topology structure, and outputting, according to a preset dynamic reduction parameter, an access sequence that is to be stored into the storage space, where an access cost of a to-be-queried graph node in the access sequence does not exceed the first access cost, and the dynamic reduction parameter is used to control a quantity of to-be-queried graph nodes in the access sequence.

With reference to the first possible implementation manner of the first aspect, in a third possible implementation manner of the first aspect, filtering out, according to the query topology relationship between the query nodes in the query topology structure, a preset first access cost of accessing the first to-be-queried graph node, and the available resource condition, the second to-be-queried graph node that is in the graph data set and whose access cost exceeds the first access cost and the association relationship that is in the graph data set and that includes the second to-be-queried graph node in order to obtain the reduction subgraph includes the following steps.

Step A: Setting a quantity of graph nodes in the reduction subgraph to 0, setting a quantity of query nodes and a quantity of graph nodes matching the query nodes to 0, where the query node and the graph node matching the query node are stored in storage space, and setting a dynamic reduction parameter to a first preset value;

Step B: Storing a start query node in the query topology structure and the start graph node into the storage space, where the start graph node matches the start query node;

Step C: Reading the query node and the graph node matching the query node that are stored in the storage space;

Step D: Determining whether the reduction subgraph includes the read graph node, where the read graph node includes the start graph node or the to-be-queried graph node;

Step E: Adding the read graph node to the reduction subgraph if the reduction subgraph does not include the read graph node, and determining that the resource occupied by the reduction subgraph does not exceed the available resource condition;

Step F: Calculating an access cost of a to-be-queried graph node adjacent to the read graph node, filtering out the second to-be-queried graph node whose access cost exceeds the first access cost and the association relationship that includes the second to-be-queried graph node whose access cost exceeds the first access cost, according to the query topology relationship between the query nodes in the query topology structure, and outputting, according to the dynamic reduction parameter, an access sequence that is to be stored into the storage space, where an access cost of a to-be-queried graph node in the access sequence does not exceed the first access cost, and the dynamic reduction parameter is used to control a quantity of to-be-queried graph nodes in the access sequence;

Step G: Determining whether the storage space is empty;

Step H: Performing step C again until the quantity of query nodes and the quantity of graph nodes matching the query nodes are 0 if the storage space is not empty, where the query node and the graph node matching the query node are stored in the storage space, or determining whether the reduction subgraph changes if the storage space is empty; and Step I: Ending the calculation in order to obtain the reduction subgraph if the reduction subgraph does not change.

With reference to the first possible implementation manner of the first aspect, in a fourth possible implementation manner of the first aspect, filtering out, according to the query topology relationship between the query nodes in the query topology structure, a preset first access cost of accessing the first to-be-queried graph node, and the available resource condition, the second to-be-queried graph node that is in the graph data set and whose access cost exceeds the first access cost and the corresponding association relationship that is in the graph data set and that includes the second to-be-queried graph node in order to obtain the reduction subgraph includes the following steps.

Step A: Setting a quantity of graph nodes in the reduction subgraph to 0, setting a quantity of query nodes and a quantity of graph nodes matching the query nodes to 0, where the query node and the graph node matching the query node are stored in storage space, and setting a dynamic reduction parameter to a first preset value;

Step B: Storing a start query node in the query topology structure and the start graph node into the storage space, where the start graph node matches the start query node;

Step C: Reading the query node and the graph node matching the query node that are stored in the storage space, and marking the read query node and the read graph node matching the query node that are in the storage space;

Step D: Determining whether the reduction subgraph includes the read graph node, where the read graph node includes the start graph node or the to-be-queried graph node;

Step E: Adding the read graph node to the reduction subgraph if the reduction subgraph does not include the read graph node, and determining that the resource occupied by the reduction subgraph does not exceed the available resource condition;

Step F: Calculating an access cost of a to-be-queried graph node adjacent to the read graph node, filtering out the second to-be-queried graph node whose access cost exceeds the first access cost and the association relationship that includes the second to-be-queried graph node whose access cost exceeds the first access cost, according to the query topology relationship between the query nodes in the query topology structure, and outputting, according to the dynamic reduction parameter, an access sequence that is to be stored into the storage space, where an access cost of a to-be-queried graph node in the access sequence does not exceed the first access cost, and the dynamic reduction parameter is used to control a quantity of to-be-queried graph nodes in the access sequence;

Step G: Determining whether an unmarked query node and a graph node matching the unmarked query node exist in the storage space;

Step H: Performing step C again until the query node and the graph node matching the query node that are stored in the storage space are marked if an unmarked query node and a graph node matching the unmarked query node exist in the storage space, or determining whether the reduction subgraph changes if the query node and the graph node matching the query node that are stored in the storage space are marked; and Step I: Ending the calculation in order to obtain the reduction subgraph if the reduction subgraph does not change.

With reference to the third possible implementation manner of the first aspect or the fourth possible implementation manner of the first aspect, in a fifth possible implementation manner of the first aspect, after determining whether the reduction subgraph changes, the method further includes storing the start query node in the query node and the start graph node into the storage space again, and adjusting a value of the dynamic reduction parameter to a second preset value if the reduction subgraph changes, and performing step C.

With reference to any one of the third possible implementation manner of the first aspect to the fifth possible implementation manner of the first aspect, in a sixth possible implementation manner of the first aspect, the method further includes ending the calculation in order to obtain the reduction subgraph if the resource occupied by the reduction subgraph exceeds the available resource condition.

According to a second aspect, an embodiment of the present disclosure provides a graph data search method, including obtaining a query request, where the query request includes a query condition that carries a start graph node and an end graph node, the query request is used to request to query a first to-be-queried graph node that is in a graph data set and that matches the query condition, and the graph data set includes the start graph node, multiple to-be-queried graph nodes, the end graph node, and an association relationship between the start graph node, the end graph node, and the multiple to-be-queried graph nodes, determining roadmap nodes in the graph data set according to betweenness centrality of multiple graph nodes in the graph data set and a preset available resource condition, and establishing a roadmap node tree according to the roadmap nodes, where the roadmap node tree includes roadmap nodes that have a hierarchical relationship, and searching the roadmap node tree according to the query condition in order to obtain the first to-be-queried graph node.

With reference to the second aspect, in a first possible implementation manner of the second aspect, the searching the roadmap node tree according to the query condition in order to obtain the first to-be-queried graph node includes obtaining auxiliary information of each roadmap node in the roadmap node tree according to the query condition, determining, according to the auxiliary information of the roadmap node, a path policy used to obtain the first to-be-queried graph node, and searching the roadmap node tree according to the path policy in order to obtain the first to-be-queried graph node.

In the graph data search method and apparatus provided in the embodiments of the present disclosure, a second to-be-queried graph node that is in a graph data set and that does not meet a query condition in a query request is filtered out according to the query condition and a preset available resource condition in order to obtain a reduction subgraph, and a query is performed in the reduction subgraph using the query condition in order to obtain a required first to-be-queried graph node. It can be learned that in the embodiments of the present disclosure, a corresponding reduction subgraph may be generated in real time on the basis of a query condition, and a query result is obtained according to the reduction subgraph generated in real time such that graph data search accuracy of a computer is improved. In addition, in the embodiments of the present disclosure, a storage resource of the computer is unoccupied in a filtering process in which a graph node in the graph data set is filtered out using the query condition in order to generate the reduction subgraph, and the generated reduction subgraph is dynamically stored in a memory, without a need to occupy a disk storage resource of the computer. Therefore, storage overheads of the computer are reduced. Further, in the method provided in the embodiments of the present disclosure, the second to-be-queried graph node that is in the graph data set and that does not meet the query condition and an association relationship that is in the graph data set and that includes the second to-be-queried graph node are filtered out according to the query condition and the preset available resource condition in order to obtain the reduction subgraph, and a query is performed in the reduction subgraph using the query condition in order to obtain the required first to-be-queried graph node. It can be learned that in the embodiments of the present disclosure, relatively precise query results can be obtained under different resource restrictions, thereby overcoming a disadvantage in a conventional query technology that a query result cannot be returned under all resource restrictions.

According to a third aspect, the present disclosure provides a graph data search apparatus, including an obtaining module configured to obtain a query request, where the query request includes a query condition that carries a start graph node, the query request is used to query a first to-be-queried graph node that is in a graph data set and that matches the query condition, and the graph data set includes the start graph node, multiple to-be-queried graph nodes, an association relationship between the start graph node and the multiple to-be-queried graph nodes, and an association relationship between each to-be-queried graph node and another to-be-queried graph node in the multiple to-be-queried graph nodes, and a processing module configured to filter out, according to the query condition and a preset available resource condition, a second to-be-queried graph node that is in the graph data set and that does not meet the query condition and an association relationship that is in the graph data set and that includes the second to-be-queried graph node in order to obtain a reduction subgraph, and perform a query in the reduction subgraph using the query condition in order to obtain the first to-be-queried graph node, where the reduction subgraph includes the start graph node, the first to-be-queried graph node that matches the query condition, and an association relationship between the start graph node and the first to-be-queried graph node.

With reference to the third aspect, in a first possible implementation manner of the third aspect, the processing module is further configured to generate a query topology structure according to the query condition, and filter out, according to a query topology relationship between query nodes in the query topology structure, a preset first access cost of accessing the first to-be-queried graph node, and the available resource condition, the second to-be-queried graph node that is in the graph data set and whose access cost exceeds the first access cost and the association relationship that is in the graph data set and that includes the second to-be-queried graph node in order to obtain the reduction subgraph, where the query topology structure includes multiple query nodes and the query topology relationship between each query node and another query node in the multiple query nodes, and a resource occupied by the reduction subgraph does not exceed the available resource condition.

With reference to the first possible implementation manner of the third aspect, in a second possible implementation manner of the third aspect, the processing module is further configured to read a query node and a graph node matching the query node that are stored in storage space, determine whether the reduction subgraph includes the read graph node, if the reduction subgraph does not include the read graph node, add the read graph node to the reduction subgraph, and determine that the resource occupied by the reduction subgraph does not exceed the available resource condition, and further calculate an access cost of a to-be-queried graph node adjacent to the read graph node, and filter out the second to-be-queried graph node whose access cost exceeds the first access cost and the association relationship that includes the second to-be-queried graph node whose access cost exceeds the first access cost, according to the query topology relationship between the query nodes in the query topology structure, and output, according to a preset dynamic reduction parameter, an access sequence that is to be stored into the storage space, where a query node in the query topology structure and a graph node matching the query node are stored in the storage space, the query node includes a start query node, the graph node includes the start graph node or the to-be-queried graph node, the start graph node matches the start query node, an access cost of a to-be-queried graph node in the access sequence does not exceed the first access cost, and the dynamic reduction parameter is used to control a quantity of to-be-queried graph nodes in the access sequence.

With reference to the first possible implementation manner of the third aspect, in a third possible implementation manner of the third aspect, the processing module is further configured to set a quantity of graph nodes in the reduction subgraph to 0, set a quantity of query nodes and a quantity of graph nodes matching the query nodes to 0, where the query node and the graph node matching the query node are stored in storage space, and set a dynamic reduction parameter to a first preset value, then store a start query node in the query topology structure and the start graph node into the storage space, read the query node and the graph node matching the query node that are stored in the storage space, then determine whether the reduction subgraph includes the read graph node, if the reduction subgraph does not include the read graph node, further add the read graph node to the reduction subgraph, and determine that the resource occupied by the reduction subgraph does not exceed the available resource condition, then further calculate an access cost of a to-be-queried graph node adjacent to the read graph node, and filter out the second to-be-queried graph node whose access cost exceeds the first access cost and the association relationship that includes the second to-be-queried graph node whose access cost exceeds the first access cost, according to the query topology relationship between the query nodes in the query topology structure, and output, according to the dynamic reduction parameter, an access sequence that is to be stored into the storage space, further determine whether the storage space is empty, if the storage space is not empty, continue to read the query node and the graph node matching the query node that are stored in the storage space, until the quantity of query nodes and the quantity of graph nodes matching the query nodes are 0, where the query node and the graph node matching the query node are stored in the storage space, or if the storage space is empty, further determine whether the reduction subgraph changes, and when the reduction subgraph does not change, end the calculation in order to obtain the reduction subgraph, where the start graph node matches the start query node, the read graph node includes the start graph node or the to-be-queried graph node, an access cost of a to-be-queried graph node in the access sequence does not exceed the first access cost, and the dynamic reduction parameter is used to control a quantity of to-be-queried graph nodes in the access sequence.

With reference to the first possible implementation manner of the third aspect, in a fourth possible implementation manner of the third aspect, the processing module is further configured to set a quantity of graph nodes in the reduction subgraph to 0, set a quantity of query nodes and a quantity of graph nodes matching the query nodes to 0, where the query node and the graph node matching the query node are stored in storage space, and set a dynamic reduction parameter to a first preset value, then store a start query node in the query topology structure and the start graph node into the storage space, read the query node and the graph node matching the query node that are stored in the storage space, and mark the read query node and the read graph node matching the query node that are in the storage space, then further determine whether the reduction subgraph includes the read graph node, if the reduction subgraph does not include the read graph node, further add the read graph node to the reduction subgraph, and determine that the resource occupied by the reduction subgraph does not exceed the available resource condition, further calculate an access cost of a to-be-queried graph node adjacent to the read graph node, and filter out the second to-be-queried graph node whose access cost exceeds the first access cost and the association relationship that includes the second to-be-queried graph node whose access cost exceeds the first access cost, according to the query topology relationship between the query nodes in the query topology structure, and output, according to the dynamic reduction parameter, an access sequence that is to be stored into the storage space, further determine whether an unmarked query node and a graph node matching the unmarked query node exist in the storage space, if an unmarked query node and a graph node matching the unmarked query node exist in the storage space, continue to read the query node and the graph node matching the query node that are stored in the storage space, until the query node and the graph node matching the query node that are stored in the storage space are marked, or if the query node and the graph node matching the query node that are stored in the storage space are marked, further determine whether the reduction subgraph changes, and when the reduction subgraph does not change, end the calculation in order to obtain the reduction subgraph, where the start graph node matches the start query node, the read graph node includes the start graph node or the to-be-queried graph node, an access cost of a to-be-queried graph node in the access sequence does not exceed the first access cost, and the dynamic reduction parameter is used to control a quantity of to-be-queried graph nodes in the access sequence.

With reference to the third possible implementation manner of the third aspect or the fourth possible implementation manner of the third aspect, in a fifth possible implementation manner of the third aspect, the processing module is further configured to if the reduction subgraph changes, store the start query node in the query node and the start graph node into the storage space again, and adjust a value of the dynamic reduction parameter to a second preset value, and continue to read the query node and the graph node matching the query node that are stored in the storage space, until the quantity of query nodes and the quantity of graph nodes matching the query nodes are 0, where the query node and the graph node matching the query node are stored in the storage space, or until the query node and the graph node matching the query node that are stored in the storage space are marked.

With reference to any one of the third possible implementation manner of the third aspect to the fifth possible implementation manner of the third aspect, in a sixth possible implementation manner of the third aspect, the processing module is further configured to if the resource occupied by the reduction subgraph exceeds the available resource condition, end the calculation in order to obtain the reduction subgraph.

According to a fourth aspect, an embodiment of the present disclosure provides a graph data search apparatus, including an obtaining module configured to obtain a query request, where the query request includes a query condition that carries a start graph node and an end graph node, the query request is used to request to query a first to-be-queried graph node that is in a graph data set and that matches the query condition, and the graph data set includes the start graph node, multiple to-be-queried graph nodes, the end graph node, and an association relationship between the start graph node, the end graph node, and the multiple to-be-queried graph nodes, and a processing module configured to determine roadmap nodes in the graph data set according to betweenness centrality of multiple graph nodes in the graph data set and a preset available resource condition, and establish a roadmap node tree according to the roadmap nodes, and search the roadmap node tree according to the query condition in order to obtain the first to-be-queried graph node, where the roadmap node tree includes roadmap nodes that have a hierarchical relationship.

With reference to the fourth aspect, in a first possible implementation manner of the fourth aspect, the processing module is further configured to obtain auxiliary information of each roadmap node in the roadmap node tree according to the query condition, determine, according to the auxiliary information of the roadmap node, a path policy used to obtain the first to-be-queried graph node, and then, search the roadmap node tree according to the path policy in order to obtain the first to-be-queried graph node.

According to the graph data search method and apparatus that are provided in the embodiments of the present disclosure, roadmap nodes are determined according to betweenness centrality of graph nodes in a graph data set and a preset available resource condition, a roadmap node tree is established, and then, the roadmap node tree is searched according to a query condition in order to determine a first to-be-queried graph node that meets the query condition. Because a roadmap node tree is used in a process of searching for a first to-be-queried graph node, paths and graph nodes that are passed through during a search for the first to-be-queried graph node are direct and effective paths and graph nodes. Therefore, an invalid search for obtaining the first to-be-queried graph node by a computer is avoided, time resources of the computer are reduced, and search efficiency is improved.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art on the basis of the embodiments of the present disclosure without creative efforts shall fall within the protection scope of the present disclosure.

Figure 1:
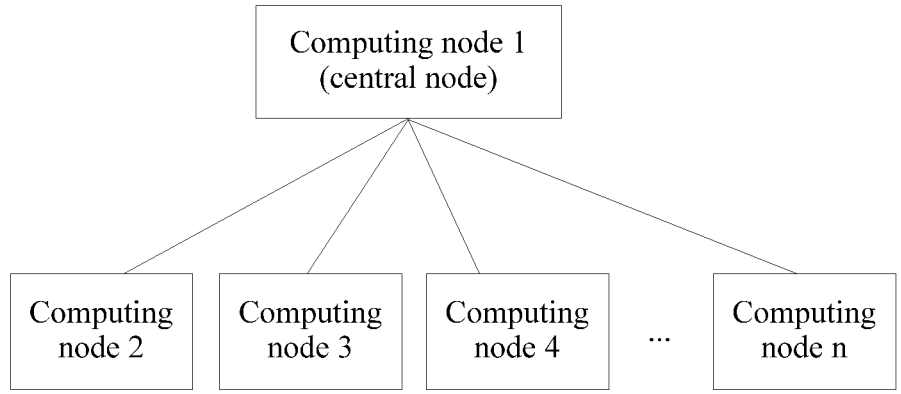
FIG. 1 is a schematic structural diagram of a distributed computing system according to the present disclosure.

The embodiments of the present disclosure are applicable to a large-scale graph data search scenario, and are further applicable to a scenario in which a computing node in a distributed computing system searches for graph data. The distributed computing system includes at least one computing node. The computing node may be, for example, a computer, or a server in a computer, or a user-oriented communications device. For the distributed computing system, refer to a system architecture diagram shown in FIG. 1. Optionally, a central node is a computing node that receives a query command of a user. The central node may split the query command entered by the user into different query requests, and send the query requests obtained by means of splitting to corresponding computing nodes such that another computing node in the distributed computing system can search for data according to a query request obtained by means of splitting by the central node. Certainly, the query requests obtained by means of splitting by the central node may also include a query request corresponding to the central node. That is, the central node may also search for data according to the query request corresponding to the central node. Optionally, technical solutions in the following embodiments are all described using a computer as an execution body.

Figure 2:
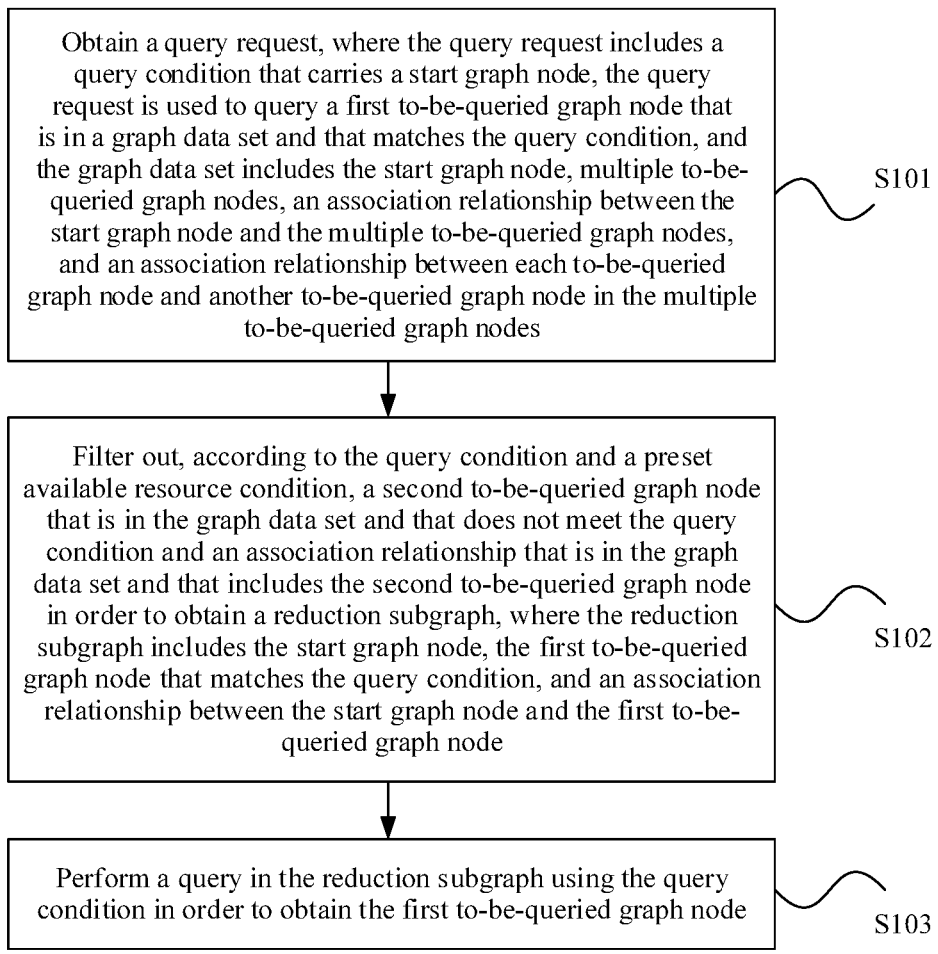
FIG. 2 is a schematic flowchart of Embodiment 1 of a graph data search method according to the present disclosure.

FIG. 2 is a schematic flowchart of Embodiment 1 of a graph data search method according to the present disclosure. As shown in FIG. 2, the method includes the following steps.

Step S101: Obtain a query request, where the query request includes a query condition that carries a start graph node, the query request is used to query a first to-be-queried graph node that is in a graph data set and that matches the query condition, and the graph data set includes the start graph node, multiple to-be-queried graph nodes, an association relationship between the start graph node and the multiple to-be-queried graph nodes, and an association relationship between each to-be-queried graph node and another to-be-queried graph node in the multiple to-be-queried graph nodes.

A computer obtains the query request of a user. Optionally, the query request may be configured by the user for the computer, or may be sent by the user to the computer using another device, for example, the query request is sent to the computer using a central node shown in FIG. 1. The query request may include the query condition that carries the start graph node, and the query request is used to query the first to-be-queried graph node that is in the graph data set and that matches the query condition. It should be noted that, because data included in the graph data set may be stored in a form of graph node, the graph data set may include the start graph node, the multiple to-be-queried graph nodes, the association relationship between the start graph node and the multiple to-be-queried graph nodes, and the association relationship between each to-be-queried graph node and another to-be-queried graph node in the multiple to-be-queried graph nodes. The association relationship in the graph data set refers to sides formed by the start graph node and all the to-be-queried graph nodes. In addition, the to-be-queried graph node in the graph data set is a graph node that is to be searched for or a graph node that is to be queried.

It should be noted that, in the graph data set, both the start graph node and the to-be-queried graph node are represented by data, and the association relationship between the start graph node and the to-be-queried graph nodes is also represented by an association relationship between data. In addition, there may be one or more first to-be-queried graph nodes.

Figure 3:
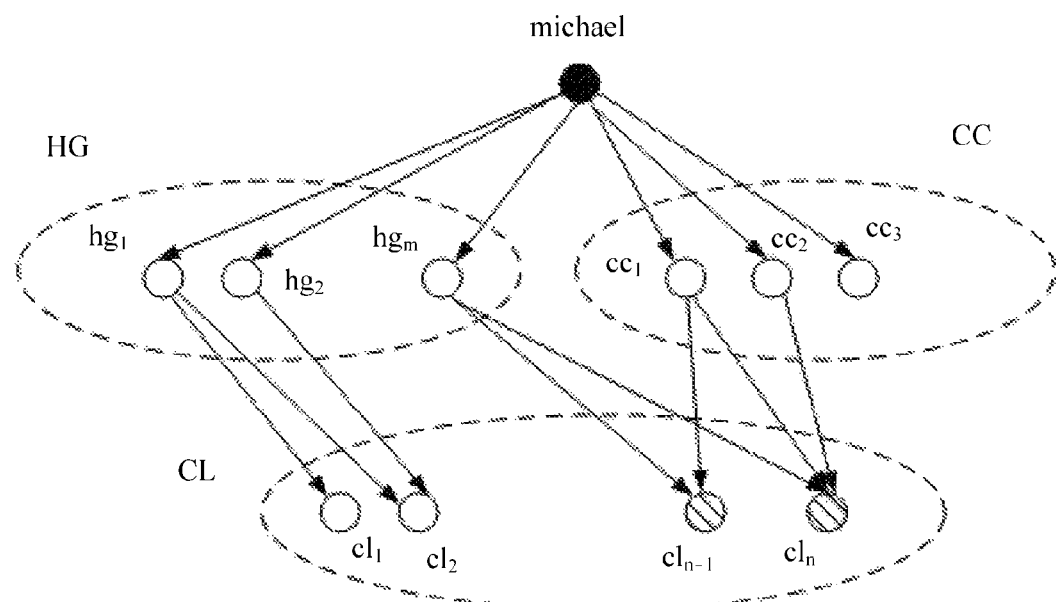
FIG. 3 is a first schematic diagram of a graph data set according to the present disclosure.

For example, referring to a graph data set shown in FIG. 3, it is assumed that a query condition in a query request is "find all cycling enthusiasts who know a member in a hiking club that michael joins and a member in an LA cycling club that michael joins". In FIG. 3, michael is a start graph node in the graph data set, and all graph nodes except michael are to-be-queried graph nodes. In FIG. 3, HG represents the hiking club, hg represents a member in the hiking club, that is, a to-be-queried graph node in the graph data set, CC represents the cycling club, cc represents a member in the cycling club and is also a to-be-queried graph node in the graph data set, CL represents a social circle of cycling enthusiasts, and cl represents a member in the CL and a to-be-queried graph node in the graph data set. In addition, connection lines that are between michael and other to-be-queried graph nodes and are shown in FIG. 3 are an association relationship between the start graph node and the to-be-queried graph nodes in the graph data set, and the association relationship is sides formed by the start graph node and all the to-be-queried graph nodes.

Step S102: Filter out, according to the query condition and a preset available resource condition, a second to-be-queried graph node that is in the graph data set and that does not meet the query condition and an association relationship that is in the graph data set and that includes the second to-be-queried graph node in order to obtain a reduction subgraph, where the reduction subgraph includes the start graph node, the first to-be-queried graph node that matches the query condition, and an association relationship between the start graph node and the first to-be-queried graph node.

After obtaining the query request, the computer parses the query request, learns the query condition in the query request, and then, determines, according to the query condition and the available resource condition preset by the computer, the second to-be-queried graph node that is in the graph data set and that does not meet the query condition and the association relationship that is in the graph data set and that includes the second to-be-queried graph node, and filters out the second to-be-queried graph node that does not meet the query condition and the association relationship that includes the second to-be-queried graph node in order to obtain the reduction subgraph. The reduction subgraph includes the start graph node, the first to-be-queried graph node that matches the query condition, and the association relationship between the start graph node and the first to-be-queried graph node. Optionally, the reduction subgraph may be in a graphics mode, or may be in a form of mapping sets that have an association relationship, or may be in another form that can represent the association relationship between the start graph node and the first to-be-queried graph node, provided that the reduction subgraph can be used by the computer to quickly find an expected result according to the query condition. The available resource condition may be a resource size threshold, a resource size range value, a resource size upper limit, or the like. There may be one or more second to-be-queried graph nodes that are filtered out by the computer and that do not meet the query condition.

It should be noted that, a "filtering" operation involved in this embodiment of the present disclosure means that the computer screens out or ignores, in the graph data set, the second to-be-queried graph node that does not meet the query condition and the association relationship corresponding to the second to-be-queried graph node in order to generate the reduction subgraph using remaining to-be-queried graph nodes in the graph data set, dynamically buffers the generated reduction subgraph into a memory, and releases the reduction subgraph after the computer obtains the first to-be-queried graph node according to the reduction subgraph. That is, the computer does not need to write the reduction subgraph from the memory into a disk such that disk storage overheads of the computer are reduced. In addition, because the computer directly finds the first to-be-queried node from the reduction subgraph in the memory, without a need to perform an input/output (IO) operation from the disk to the memory, few time processing resources are consumed, and graph data search efficiency of the computer is effectively improved.

In addition, the "association relationship between the start graph node and the to-be-queried graph nodes" described in the graph data set refers only to sides formed by all graph nodes in the graph data set, and the association relationship in the reduction subgraph includes all to-be-queried graph nodes and sides in a path from the start graph node to the first to-be-queried graph node. In addition, the preset available resource condition is used to constrain a size of a resource occupied by the reduction subgraph.

Figure 4:
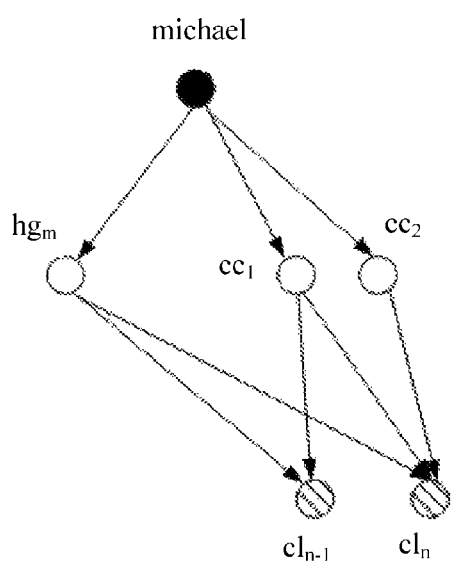
FIG. 4 is a schematic diagram of a reduction subgraph according to the present disclosure.

Still referring to the example used in FIG. 3, the computer determines, according to the query condition and a preset available resource, that $hg_1$, $hg_2$, $cc_3$, and $cl_1$ and $cl_2$ of $hg_1$ and $hg_2$ do not meet the query condition, and deletes $hg_1$, $hg_2$, $cc_3$, $cl_1$, and $cl_2$, and association relationships corresponding to these second to-be-queried graph nodes in order to generate a reduction subgraph. The reduction subgraph may be shown in FIG. 4. The reduction subgraph includes first to-be-queried graph nodes $cl_n$ and $cl_{n-1}$ that meet the query condition and an association relationship between these first to-be-queried graph nodes and the start graph node (the association relationship includes not only three to-be-queried graph nodes, $hg_m$, $cc_1$, and $cc_2$, but also sides formed by the three to-be-queried graph nodes, the start graph node, and the first to-be-queried graph nodes). In addition, a storage resource occupied by the reduction subgraph does not exceed the preset available resource condition.

That is, on the basis of the query condition and the preset available resource condition together, the computer filters out the second to-be-queried graph node that does not meet the query condition and the association relationship corresponding to the second to-be-queried graph node.

Step S103: Perform a query in the reduction subgraph using the query condition in order to obtain the first to-be-queried graph node.

In other approaches, during a search for data on a corresponding graph node, a sample is usually collected, and the collected sample is statically stored into a disk. All query requests received by a computer are requests for performing a query on the basis of the sample stored in the disk. Therefore, storage resources of the computer are wasted. On the other hand, because all the query requests are requests for performing a query on the basis of the same sample in the disk, query precision is not high. However, in this embodiment of the present disclosure, a method for filtering out a graph node in a graph data set according to a query condition is used. A storage resource of a computer is unoccupied in a filtering process, and a generated reduction subgraph is dynamically stored into a memory, without a need to occupy a disk storage resource of the computer. Therefore, storage overheads of the computer are reduced. On the other hand, in a search process, after completing a query according to a query condition, the computer releases the reduction subgraph, and after receiving a new query request at a next moment, the computer dynamically generates a new reduction subgraph, and performs a query on the basis of the new reduction subgraph. Therefore, the method provided in this embodiment of the present disclosure improves graph data search accuracy of the computer. Further, in the method provided in this embodiment of the present disclosure, a precise query result of a query can be returned under any resource restriction, thereby overcoming a disadvantage in a conventional query technology that a query result cannot be returned under all resource restrictions.

In the graph data search method provided in this embodiment of the present disclosure, a second to-be-queried graph node that is in a graph data set and that does not meet a query condition in a query request is filtered out according to the query condition and a preset available resource in order to obtain a reduction subgraph, and a required first to-be-queried graph node is obtained according to the reduction subgraph. That is, in this embodiment of the present disclosure, a method for filtering out a graph node in a graph data set according to a query condition in order to generate a reduction subgraph is used. A storage resource of a computer is unoccupied in a filtering process, and the generated reduction subgraph is dynamically stored into a memory, without a need to occupy a disk storage resource of the computer. Therefore, storage overheads of the computer are reduced. On the other hand, in this embodiment of the present disclosure, reduction subgraphs are generated in real time on the basis of different query conditions, and query results are obtained according to the reduction subgraphs generated in real time such that graph data search accuracy of the computer is improved. Further, in the method provided in this embodiment of the present disclosure, a precise query result of a query can be returned under any resource restriction, thereby overcoming a disadvantage in a conventional query technology that a query result cannot be returned under all resource restrictions.

Figure 5:
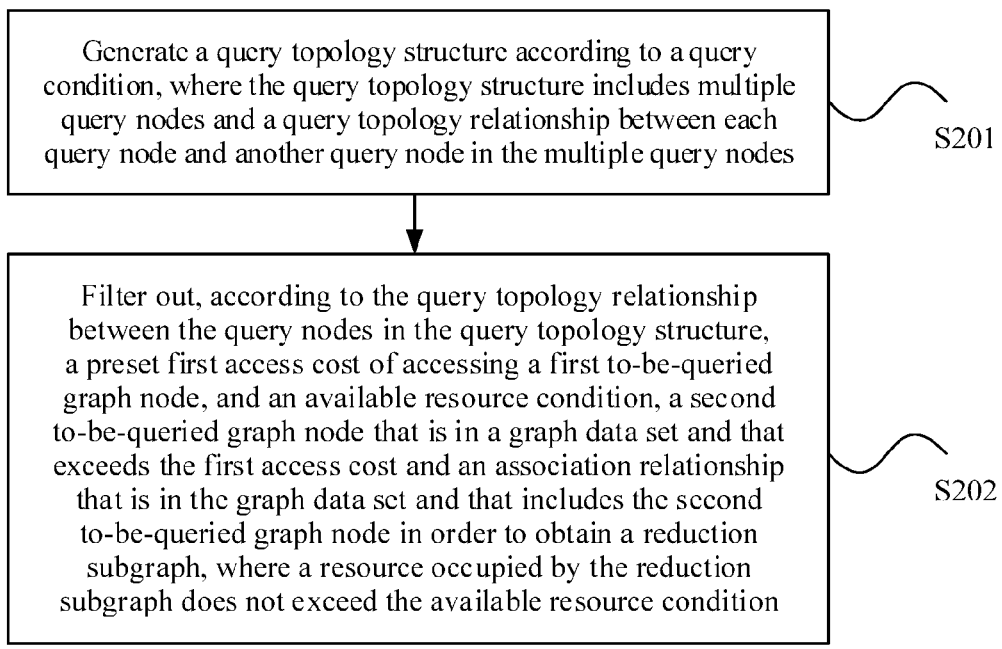
FIG. 5 is a schematic flowchart of Embodiment 2 of a graph data search method according to the present disclosure.

FIG. 5 is a schematic flowchart of Embodiment 2 of a graph data search method according to the present disclosure. On the basis of the foregoing embodiment, a specific process in which the computer obtains the reduction subgraph is involved in this embodiment. Further, the foregoing step S102 includes the following steps.

Step S201: Generate a query topology structure according to the query condition, where the query topology structure includes multiple query nodes and a query topology relationship between each query node and another query node in the multiple query nodes.

The query topology structure generated by the computer according to the query condition may be in a form of query mode graph. In the query topology structure, there is a query topology between each query node and another query node.

Figure 6:
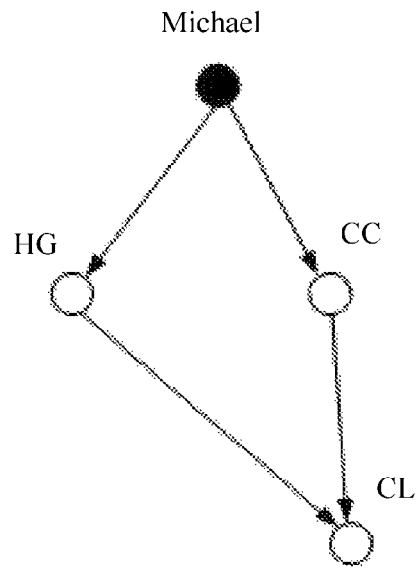
FIG. 6 is a schematic diagram of a query topology structure according to the present disclosure.

For ease of understanding of the query topology structure, a simple example is used herein for description. Referring to a query topology structure shown in FIG. 6, the computer learns, according to the query condition "find all cycling enthusiasts who know a member in a hiking club that michael joins and a member in an LA cycling club that michael joins" in the foregoing example shown in FIG. 3, that a cycling enthusiast (that is, a first to-be-queried graph node) that the computer needs to find is a person that both a member in HG and a member in CC know, and that the person belongs to a CL of cycling enthusiasts. Therefore, the computer sets Michael as a start query node (For ease of differentiation from michael in the graph data set, Michael is used herein. Michael actually means a query node, a purpose of the query node is to find a person named michael, and michael refers to an actual graph node in the graph data set. That is, the start query node Michael and the start graph node michael match each other, and the start graph node michael is a person that the start query node Michael needs to find). Then, the computer uses HG, CC, and CL as other query nodes, that is, the person that the computer needs to find needs to be a person in CL, and the person needs to be a person that both a member in HG and a member in CC know. Therefore, the computer constructs the query topology structure, and then, may perform a query according to a query topology relationship between the query nodes in the query topology structure in a query process. For example, the computer needs to perform a query only in persons in HG, CC, and CL, without a need to perform a query in another social circle. The construction of the query topology structure reduces a query time of the computer and reduces time processing resources of the computer.

Step S202: Filter out, according to the query topology relationship between the query nodes in the query topology structure, a preset first access cost of accessing the first to-be-queried graph node, and the available resource condition, the second to-be-queried graph node that is in the graph data set and that exceeds the first access cost and the association relationship that is in the graph data set and that includes the second to-be-queried graph node in order to obtain the reduction subgraph, where a resource occupied by the reduction subgraph does not exceed the available resource condition.

In order to obtain the first to-be-queried graph node using fewest resources, the computer presets the first access cost of accessing the first to-be-queried graph node, that is, an access cost at which the computer finds the first to-bequeried graph node in a path starting from the start graph node cannot exceed the first access cost.

Therefore, the computer filters out, according to the query topology relationship between the query nodes in the generated query topology structure, the first access cost of accessing the first to-be-queried graph node, and the preset available resource condition, the second to-be-queried graph node that is in the graph data set and that exceeds the first access cost and the association relationship that is in the graph data set and that includes the second to-be-queried graph node in order to obtain the reduction subgraph.

For example, still referring to the example used in FIG. 3, the computer determines that a cycling enthusiast who knows not only a member in HG that michael joins but also a member in the LA cycling club that michael joins ("a cycling enthusiast who knows not only a member in HG that michael joins but also a member in the LA cycling club that michael joins" herein is a first to-be-queried graph node that the computer needs to find) cannot be found in a path that starts from the start graph node and that passes through $hg_1$, $hg_2$, or $cc_3$. An access cost at which the computer finds the first to-be-queried graph node in this path may be considered as infinitely high, and therefore, exceeds the first access cost. Therefore, the computer filters out $hg_1$, $hg_2$, $cc_3$, $cl_1$, and $cl_2$ ($hg_1$, $hg_2$, $cc_3$, $cl_1$, and $cl_2$ are second to-be-queried graph nodes), and the association relationships that include these second to-be-queried graph nodes in order to generate the reduction subgraph. The reduction subgraph may be shown in FIG. 4. The reduction subgraph includes the first to-be-queried graph nodes $cl_n$ and $cl_{n-1}$ and the association relationship between these first to-be-queried graph nodes and the start graph node (the association relationship includes not only the three to-be-queried graph nodes, $hg_m$, $cc_1$, and $cc_2$, but also the sides formed by the three to-be-queried graph nodes, the start graph node, and the first to-be-queried graph node, that is, the association relationship between the first to-be-queried graph node and the start graph node includes the to-be-queried graph nodes in the path from the start graph node to the first to-be-queried graph node and the sides that form the path). In addition, the storage resource occupied by the reduction subgraph does not exceed the preset available resource condition.

In the graph data search method provided in this embodiment of the present disclosure, a second to-be-queried graph node that is in a graph data set and that exceeds a preset first access cost and an association relationship that is in the graph data set and that includes the second to-be-queried graph node are filtered out using a query topology structure, the first access cost, and an available resource condition in order to obtain a reduction subgraph. A storage resource of a computer is unoccupied in a filtering process, and the generated reduction subgraph is dynamically stored into a memory, without a need to occupy a disk storage resource of the computer. Therefore, storage overheads of the computer are reduced. On the other hand, in this embodiment of the present disclosure, reduction subgraphs are generated in real time on the basis of different query conditions, and query results are obtained according to the reduction subgraphs generated in real time such that graph data search accuracy of the computer is improved. Further, in the method provided in this embodiment of the present disclosure, a precise query result of a query can be returned under any resource restriction, thereby overcoming a disadvantage in a conventional query technology that a query result cannot be returned under all resource restrictions.

Figure 7:
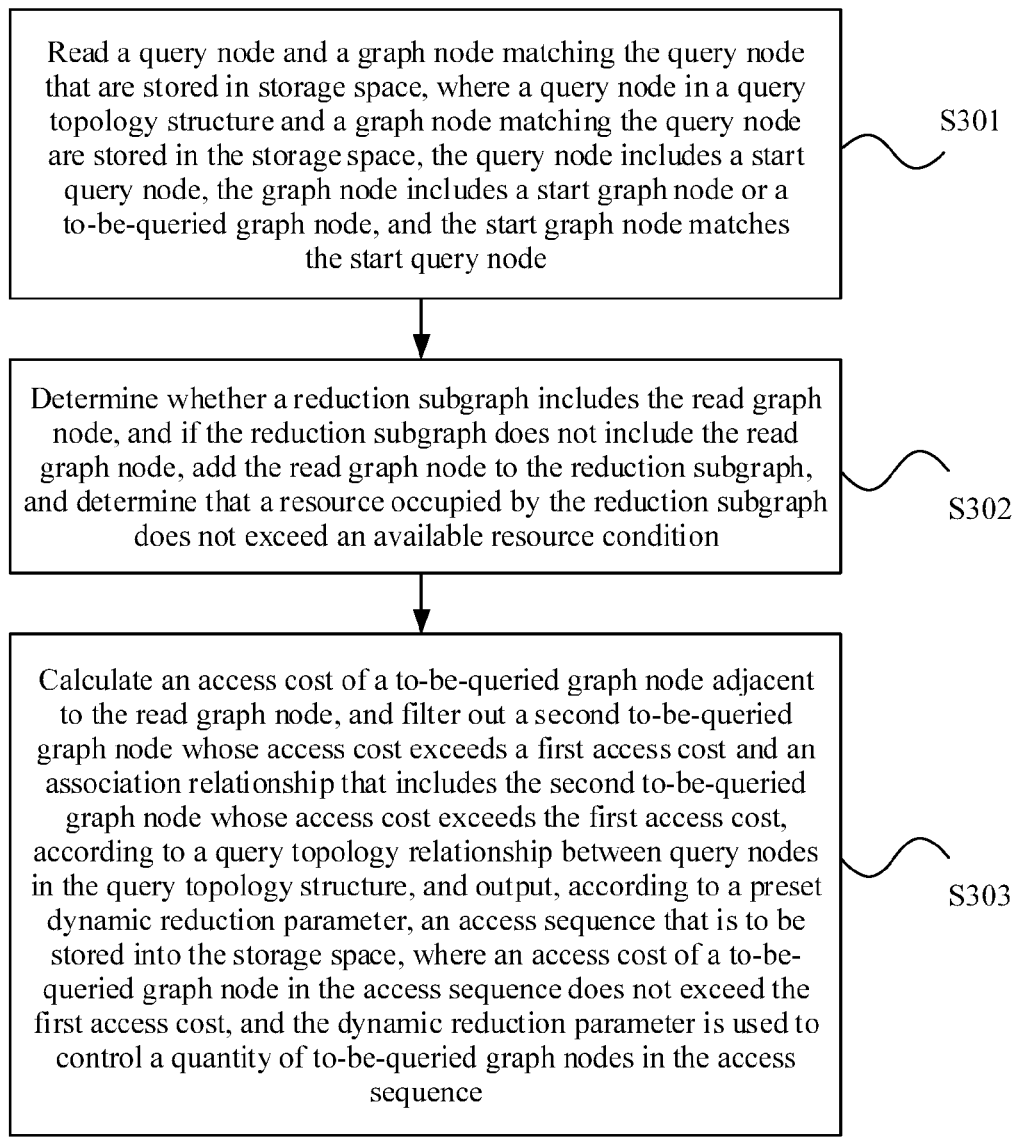
FIG. 7 is a schematic flowchart of Embodiment 3 of a graph data search method according to the present disclosure.

FIG. 7 is a schematic flowchart of Embodiment 3 of a graph data search method according to the present disclosure. On the basis of the foregoing embodiment, a specific implementation process in which the computer determines the reduction subgraph according to the query topology structure, the first access cost, and the preset available resource condition is involved in this embodiment. Further, as shown in FIG. 7, the foregoing step S202 includes the following steps.

Step S301: Read a query node and a graph node matching the query node that are stored in storage space, where a query node in the query topology structure and a graph node matching the query node are stored in the storage space, the query node includes a start query node, the graph node includes the start graph node or the to-be-queried graph node, and the start graph node matches the start query node.

After generating the query topology structure according to a query, the computer reads, according to the query topology structure, the query node and the graph node matching the query node that are stored in the storage space. The query node herein includes the start query node, and optionally, may further include another query node that can assist the computer in finding the first to-be-queried graph node. There is a query topology between the other query node and the start query node. The storage space may further include the start graph node that matches the start query node, and may further include to-be-queried graph nodes that may be written into the reduction subgraph, that is, these graph nodes stored in the storage space of the computer may be remaining to-be-queried graph nodes obtained after the computer performs filtering and screening. The computer can find the first to-be-queried graph node using these to-be-queried graph nodes.

It should be noted that, when the graph node stored in the storage space is a to-be-queried graph node, the to-be-queried graph node is actually added to the storage space by performing the following step S303. That is, a circular execution process actually includes step S301 and the following steps S302 and S303. For a specific process, refer to the following description.

Step S302: Determine whether the reduction subgraph includes the read graph node, and if the reduction subgraph does not include the read graph node, add the read graph node to the reduction subgraph, and determine that the resource occupied by the reduction subgraph does not exceed the available resource condition.

Further, when determining that the reduction subgraph does not include the graph node that is read from the storage space, the computer adds the read graph node to the reduction subgraph. In addition, after adding the read graph node to the reduction subgraph, the computer further determines whether the memory resource occupied by the reduction subgraph exceeds the available resource condition.

It should be noted that, the available resource condition herein may be a resource size threshold, or may be a resource size range value, or may be a resource size limit. In addition, the resource occupied by the reduction subgraph refers to an occupied memory resource of the computer.

Step S303: Calculate an access cost of a to-be-queried graph node adjacent to the read graph node, and filter out the second to-be-queried graph node whose access cost exceeds the first access cost and the association relationship that includes the second to-be-queried graph node whose access cost exceeds the first access cost, according to the query topology relationship between the query nodes in the query topology structure, and output, according to a preset dynamic reduction parameter, an access sequence that is to be stored into the storage space, where an access cost of a to-be-queried graph node in the access sequence does not exceed the first access cost, and the dynamic reduction parameter is used to control a quantity of to-be-queried graph nodes in the access sequence.

Further, when the computer determines that the resource occupied by the reduction subgraph to which the read graph node has been added does not exceed the available resource condition, the computer further calculates the access cost of the to-be-queried graph node (hereinafter referred to as a neighboring to-be-queried graph node) adjacent to the read graph node, that is, calculates an access cost of finding the first to-be-queried access graph node from the neighboring to-be-queried graph node, according to the query topology relationship between the query nodes in the determined query topology structure.

Then, the computer filters out the second to-be-queried graph node whose access cost exceeds the first access cost. The second to-be-queried graph node is a to-be-queried graph node that is screened out in the neighboring to-be-queried graph node and whose access cost exceeds the first access cost. In addition, the computer further filters out the association relationship that includes the second to-be-queried graph node.

After the computer filters out the second to-be-queried graph node and the association relationship that includes the second to-be-queried graph node, the computer may determine, according to the preset dynamic reduction parameter, from a remaining neighboring to-be-queried graph node whose access cost does not exceed the first access cost, the access sequence that is to be stored into the storage space. The quantity of graph nodes in the access sequence is determined by the dynamic reduction parameter. It should be noted that, the graph node in the access sequence is a neighboring to-be-queried graph node whose access cost does not exceed the first access cost.

After determining the access sequence that may be stored into the storage space, the computer stores the access sequence into the storage space, that is, stores the graph node in the access sequence into the storage space such that the computer can perform step S301 again, and further determine a graph node that is to be added to the reduction subgraph in order to obtain the reduction subgraph.

In the graph data search method provided in this embodiment of the present disclosure, a graph node that may be added to a reduction subgraph is determined from a graph data set according to a query topology structure, a preset first access cost, and an available resource condition in order to obtain the reduction subgraph, and a first to-be-queried graph node is further found using the reduction subgraph. In the method provided in this embodiment of the present disclosure, because a reduction subgraph is buffered in a memory of a computer, a result can be obtained by performing a query in the reduction subgraph in the memory, without a need to perform an IO operation such that graph data search efficiency of the computer is effectively improved. In addition, after completing one search, the computer releases a previously generated reduction subgraph, and during a next search, the computer searches for graph data again according to a new query request. That is, in this embodiment of the present disclosure, the computer generates a reduction subgraph in real time according to a query condition, and obtains a precise search result in real time according to the reduction subgraph. Therefore, the method provided in this embodiment of the present disclosure improves graph data search precision.

Figure 8A:
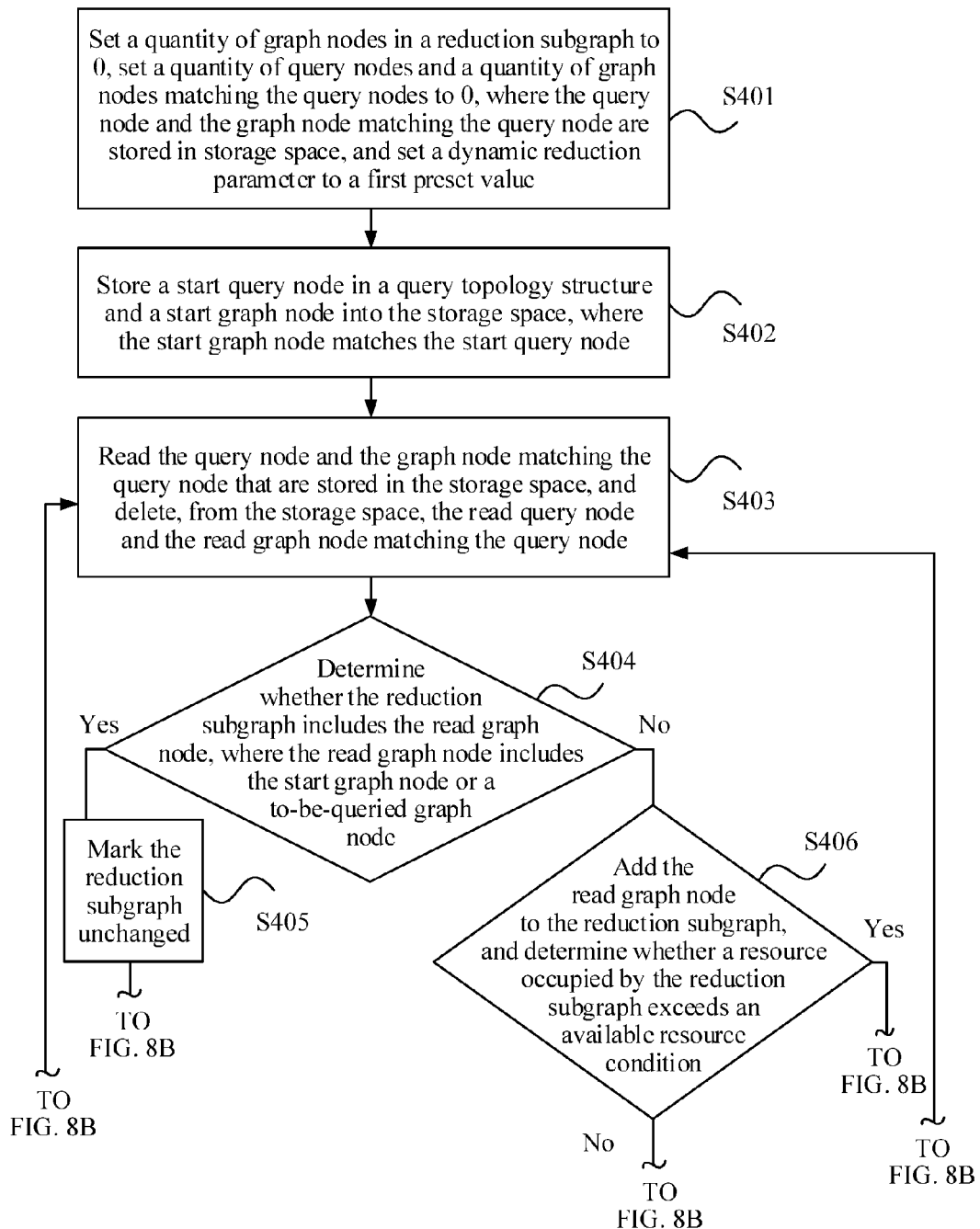
FIG. 8A and FIG. 8B are a schematic flowchart of Embodiment 4 of a graph data search method according to the present disclosure.
Figure 8B:
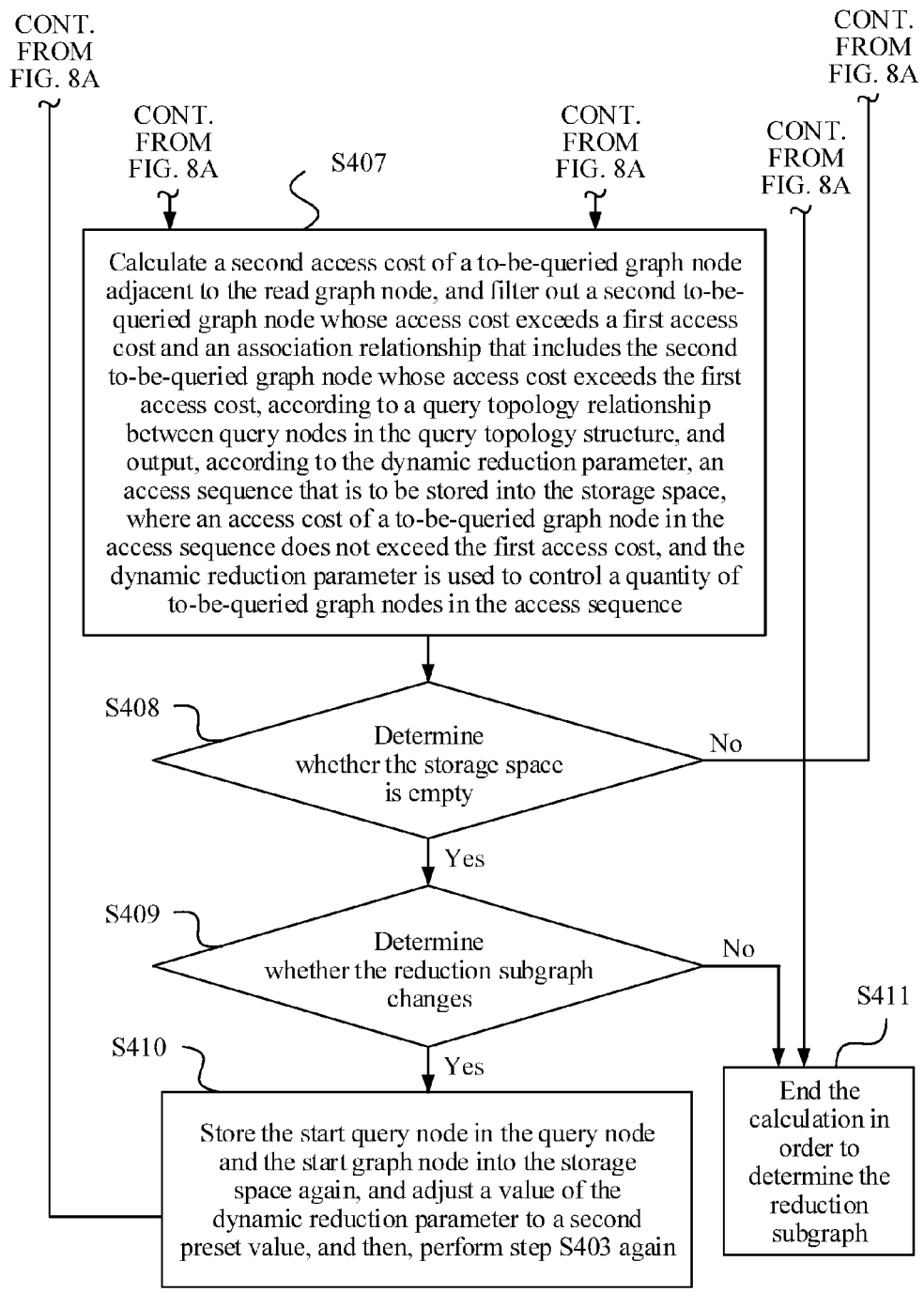

FIG. 8A and FIG. 8B are a schematic flowchart of Embodiment 4 of a graph data search method according to the present disclosure. On the basis of the foregoing embodiment, another specific implementation process in which the computer determines the reduction subgraph according to the query topology structure, the first access cost, and the preset available resource is involved in this embodiment. Further, as shown in FIG. 8A and FIG. 8B, the foregoing step S202 includes the following steps.

Step S401: Set a quantity of graph nodes in the reduction subgraph to 0, set a quantity of query nodes and a quantity of graph nodes matching the query nodes to 0, where the query node and the graph node matching the query node are stored in storage space, and set a dynamic reduction parameter to a first preset value.

Further, after generating the query topology structure, the computer may initialize the reduction subgraph, the storage space used to buffer a query node and a graph node matching the query node, and the dynamic reduction parameter, that is, set the quantity of graph nodes in the reduction subgraph to 0, set the quantity of query nodes and the quantity of graph nodes matching the query nodes to 0, where the query node and the graph node matching the query node are stored in the storage space, and set the dynamic reduction parameter to the first preset value. Therefore, in this case, the reduction subgraph is empty, the storage space is empty, the first preset value is a parameter for controlling a quantity of to-be-queried graph nodes in the following access sequence, and the parameter can be used by the computer to find the first to-be-queried graph node using fewest resources.

Step S402: Store a start query node in the query topology structure and the start graph node into the storage space, where the start graph node matches the start query node.

It should be noted that, a node pair includes the start query node and the start graph node, and the computer stores the node pair into the storage space. Optionally, in this embodiment, the storage space may be storage space having a stack structure, or may be a storage module, provided that the storage space is characterized by "first in last out", that is, the computer obtains data from the storage space according to the "first in last out" principle.

Step S403: Read the query node and the graph node matching the query node that are stored in the storage space, and delete, from the storage space, the read query node and the read graph node matching the query node.

After the foregoing step S402, because the storage space includes only the node pair that includes the start query graph node and the start graph node, in this case, in step S403, the query node read by the computer should be the start query node, and the read graph node is the start graph node. However, when the storage space further includes another query node and graph node, in step S403, the query node and the graph node that are read by the computer need to depend on an actual case. For a process in which the computer reads a graph node from the storage space, refer to an example in the following embodiment.

Step S404: Determine whether the reduction subgraph includes the read graph node, where the read graph node includes the start graph node or the to-be-queried graph node, and perform step S405 if the reduction subgraph includes the read graph node, or perform step S406 if the reduction subgraph does not include the read graph node.

Step S405: Mark the reduction subgraph unchanged, and perform S407.

Step S406: Add the read graph node to the reduction subgraph, and determine whether the resource occupied by the reduction subgraph exceeds the available resource condition, and perform step S411 if the resource occupied by the reduction subgraph exceeds the available resource condition, or perform step S407 if the resource occupied by the reduction subgraph does not exceed the available resource condition.

Further, after the computer adds the read graph node to the reduction subgraph in order to prevent the storage resource occupied by the reduction subgraph from exceeding the available resource condition, the computer needs to determine whether the resource occupied by the reduction subgraph exceeds the available resource condition.

Step S407: Calculate a second access cost of a to-be-queried graph node adjacent to the read graph node, and filter out the second to-be-queried graph node whose access cost exceeds the first access cost and the association relationship that includes the second to-be-queried graph node whose access cost exceeds the first access cost, according to the query topology relationship between the query nodes in the query topology structure, and output, according to the dynamic reduction parameter, an access sequence that is to be stored into the storage space, where an access cost of a to-be-queried graph node in the access sequence does not exceed the first access cost, and the dynamic reduction parameter is used to control a quantity of to-be-queried graph nodes in the access sequence.

Further, when the computer determines that the resource occupied by the reduction subgraph does not exceed the available resource condition, the computer calculates the access cost of the to-be-queried graph node adjacent to the read graph node in step S403 (the following to-be-queried graph node adjacent to the read graph node is referred to as a neighboring to-be-queried graph node) according to the query topology relationship between the query nodes in the query topology structure. The computer determines whether the access cost of the neighboring to-be-queried graph node exceeds the first access cost. If the access cost of the neighboring to-be-queried graph node exceeds the first access cost, the neighboring to-be-queried graph node is the second to-be-queried graph node, and the computer filters out the second to-be-queried graph node and the association relationship that includes the second to-be-queried graph node. If the access cost of the neighboring to-be-queried graph node does not exceed the first access cost, the computer adds the neighboring to-be-queried graph node to the access queue (because the graph node may be the first to-be-queried graph node or a graph node that can assist the computer in finding the first to-be-queried graph node). In addition, the computer further determines, according to the dynamic reduction parameter, a quantity of node pairs that are to be added to the access sequence. One node pair includes one query node and one graph node matching the query node. After determining the access sequence, the computer stores the access sequence into the storage space, that is, stores the to-be-queried graph node in the access sequence into the storage space.

Step S408: Determine whether the storage space is empty, and perform step S409 if the storage space is empty, or perform step S403 until the quantity of query nodes and the quantity of graph nodes matching the query nodes are 0 if the storage space is not empty, and after it is determined that the quantity of query nodes and the quantity of graph nodes matching the query nodes are 0, perform step S409, where the query node and the graph node matching the query node are stored in the storage space.

Step S409: Determine whether the reduction subgraph changes, and perform step S410 if the reduction subgraph changes, or perform step S411 if the reduction subgraph does not change.

Step S410: Store the start query node in the query node and the start graph node into the storage space again, and adjust a value of the dynamic reduction parameter to a second preset value, and then, perform step S403 again.

Further, when the reduction subgraph changes, it indicates that there is still another neighboring to-be-queried graph node whose access cost does not exceed the first access cost and that is not added to the reduction subgraph, that is, it implicitly indicates that a search range of the computer is excessively small. Therefore, adjusting the dynamic reduction parameter herein may be increasing the initial dynamic reduction parameter such that the quantity of node pairs that are to be added to the access queue is increased, and the search range of the computer is further expanded in order to obtain a precise result.

Step S411: End the calculation in order to determine the reduction subgraph.

Figure 9A:
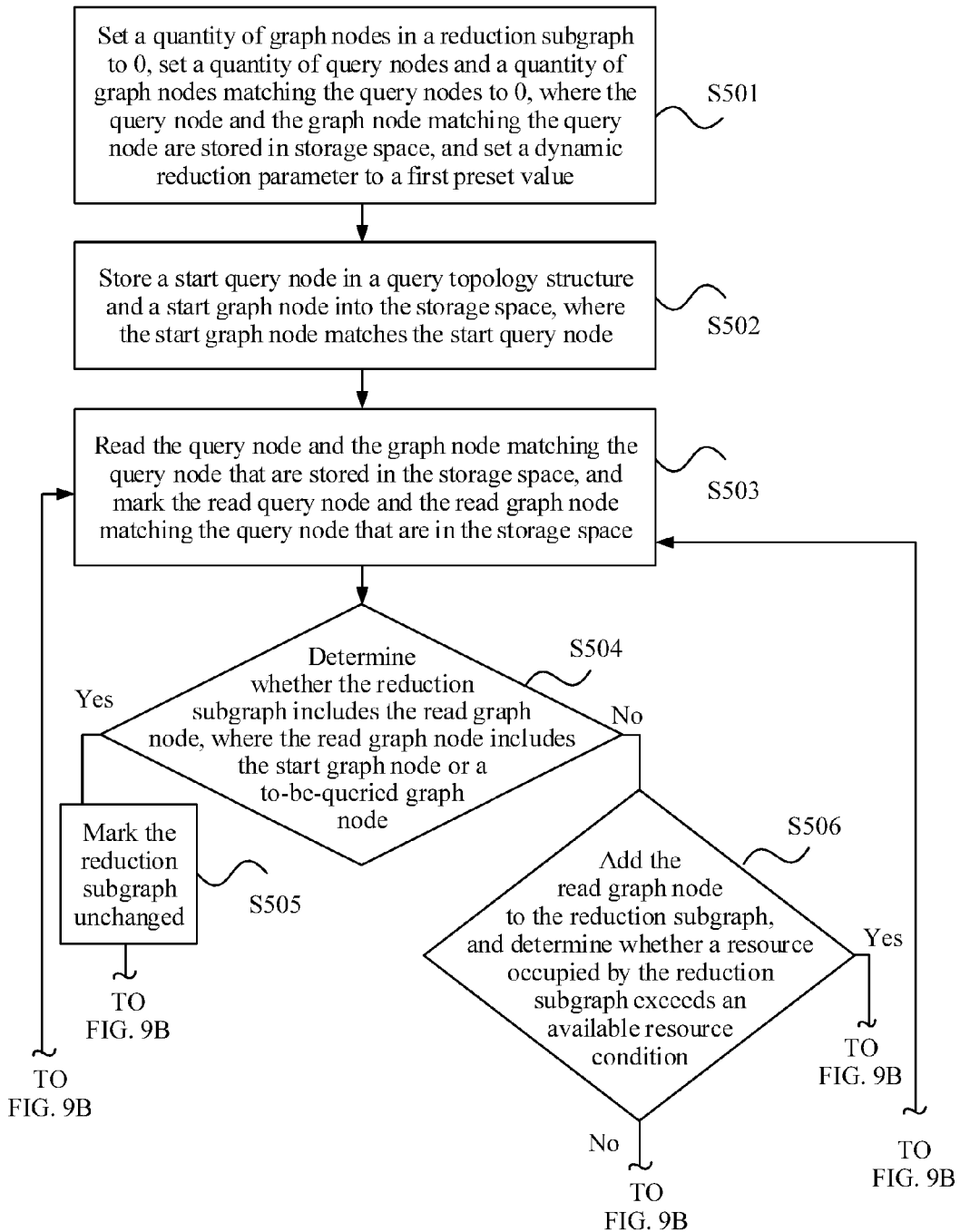
FIG. 9A and FIG. 9B are a schematic flowchart of Embodiment 5 of a graph data search method according to the present disclosure.
Figure 9B:
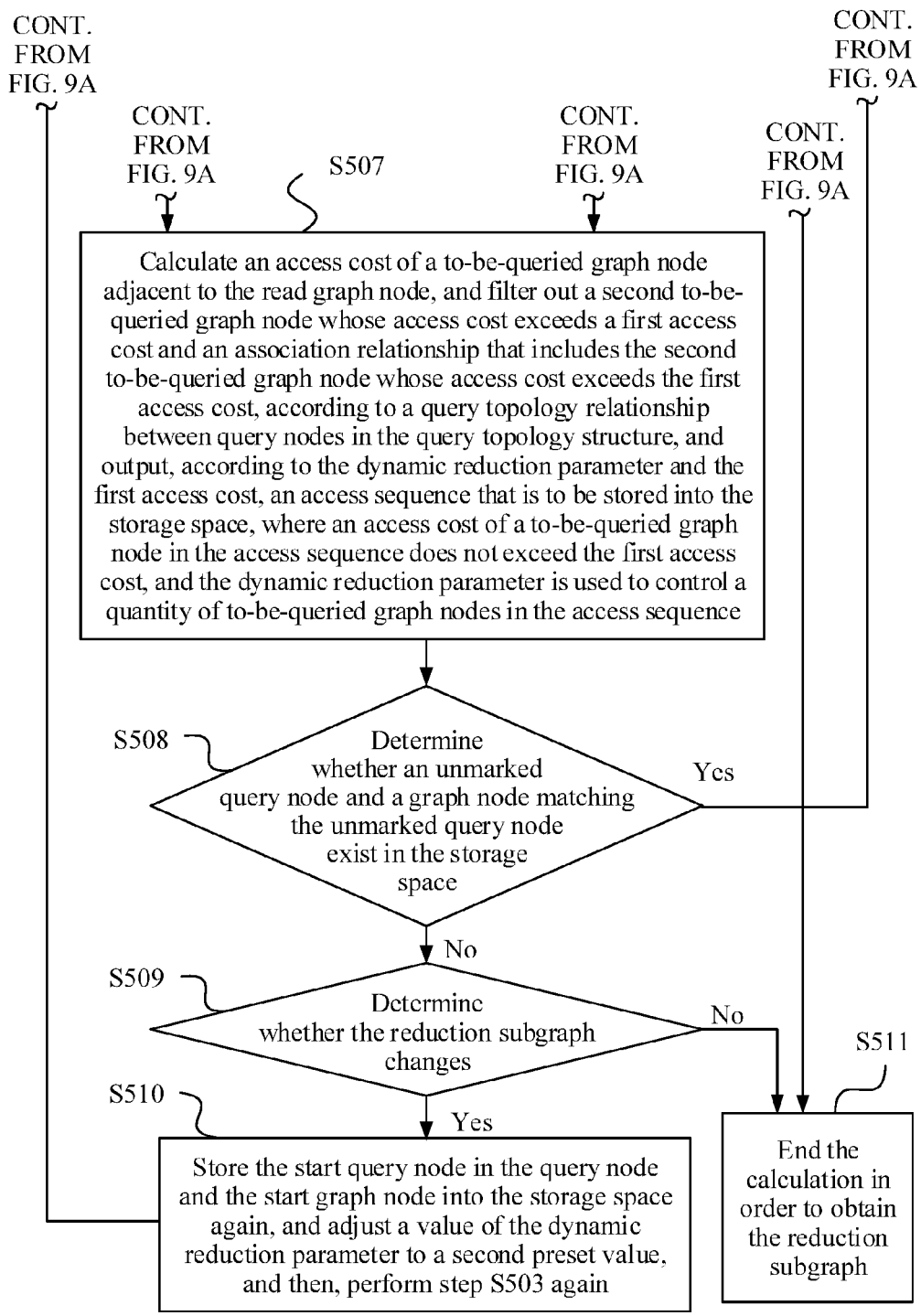

FIG. 9A and FIG. 9B are a schematic flowchart of Embodiment 5 of a graph data search method according to the present disclosure. On the basis of the foregoing embodiment shown in FIG. 3, another specific implementation process in which the computer determines the reduction subgraph according to the query topology relationship between the query nodes in the query topology structure, the first access cost, and the preset available resource is involved in this embodiment. Further, as shown in FIG. 9A and FIG. 9B, the foregoing step S202 includes the following steps.

Step S501: Set a quantity of graph nodes in the reduction subgraph to 0, set a quantity of query nodes and a quantity of graph nodes matching the query nodes to 0, where the query node and the graph node matching the query node are stored in storage space, and set a dynamic reduction parameter to a first preset value.

Step S502: Store a start query node in the query topology structure and the start graph node into the storage space, where the start graph node matches the start query node.

Step S503: Read the query node and the graph node matching the query node that are stored in the storage space, and mark the read query node and the read graph node matching the query node that are in the storage space.

Step S504: Determine whether the reduction subgraph includes the read graph node, where the read graph node includes the start graph node or the to-be-queried graph node, and perform step S505 if the reduction subgraph includes the read graph node, or perform step S506 if the reduction subgraph does not include the read graph node.

Step S505: Mark the reduction subgraph unchanged, and perform step S507.

Step S506: Add the read graph node to the reduction subgraph, and determine whether the resource occupied by the reduction subgraph exceeds the available resource condition, and perform step S511 if the resource occupied by the reduction subgraph exceeds the available resource condition, or perform step S507 if the resource occupied by the reduction subgraph does not exceed the available resource condition.

Step S507: Calculate an access cost of a to-be-queried graph node adjacent to the read graph node, and filter out the second to-be-queried graph node whose access cost exceeds the first access cost and the association relationship that includes the second to-be-queried graph node whose access cost exceeds the first access cost, according to the query topology relationship between the query nodes in the query topology structure, and output, according to the dynamic reduction parameter and the first access cost, an access sequence that is to be stored into the storage space, where an access cost of a to-be-queried graph node in the access sequence does not exceed the first access cost, and the dynamic reduction parameter is used to control a quantity of to-be-queried graph nodes in the access sequence.

Further, for specific processes of the foregoing steps S501 to S507, refer to content in Embodiment 4 shown in FIG. 8A and FIG. 8B. The specific execution processes of the foregoing steps S501 to S507 are similar to those in Embodiment 4, and details are not described herein again.

Step S508: Determine whether an unmarked query node and a graph node matching the unmarked query node exist in the storage space, and if an unmarked query node and a graph node matching the unmarked query node exist in the storage space, perform step S503 until the query node and the graph node matching the query node that are stored in the storage space are marked, and after it is determined that the query node and the graph node matching the query node that are stored in the storage space are marked, perform step S509, or if an unmarked query node and a graph node matching the unmarked query node do not exist in the storage space, perform step S509.

Further, as described above, the computer reads the query node and the graph node matching the query node from the storage space, and adds the read query node and the read graph node matching the query node to the reduction subgraph. Therefore, the computer marks the graph node and the query node matching the graph node that are in the storage space and that have been added to the reduction subgraph. Therefore, the computer needs to determine whether an unmarked query node and a graph node matching the unmarked query node exist in the storage space, that is, determine whether a graph node that is not added to the reduction subgraph still exists in the storage space. If an unmarked query node and a graph node matching the unmarked query node exist in the storage space, the computer performs the foregoing step S503 again until the query node and the graph node matching the query node that are stored in the storage space are marked.

Step S509: Determine whether the reduction subgraph changes, and perform step S510 if the reduction subgraph changes, or perform step S511 if the reduction subgraph does not change.

Step S510: Store the start query node in the query node and the start graph node into the storage space again, and adjust a value of the dynamic reduction parameter to a second preset value, and then, perform S503 again.

Further, when the reduction subgraph changes, it indicates that there is still another neighboring to-be-queried graph node whose access cost does not exceed the first access cost and that is not added to the reduction subgraph, that is, it implicitly indicates that a search range of the computer is excessively small. Therefore, adjusting the dynamic reduction parameter herein may be increasing the initial dynamic reduction parameter such that a quantity of node pairs that are to be added to the access queue is increased, and the search range of the computer is further expanded in order to obtain a precise result.

Step S511: End the calculation in order to obtain the reduction subgraph.

Steps S401 to S411 in the foregoing embodiment shown in FIG. 8A and FIG. 8B and steps S501 to S511 in the foregoing embodiment shown in FIG. 9A and FIG. 9B are specific implementation processes in which the computer determines the reduction subgraph according to the query topology structure, the first access cost, and the preset available resource condition. For ease of understanding of the flowchart shown in FIG. 8A and FIG. 8B and that shown in FIG. 9A and FIG. 9B, the foregoing example shown in FIG. 3 is still used herein for more specific description. Because the processes in FIG. 8A and FIG. 8B and those in FIG. 9A and FIG. 9B are similar, only a circular operation in the flowchart shown in FIG. 8A and FIG. 8B is shown using a specific example herein. For details, refer to the following nine main steps, A to I.

Step A:

(1) Set a quantity of graph nodes in the reduction subgraph ($G_Q$) to 0, set a quantity of query nodes and a quantity of graph nodes matching the query nodes to 0, where the query node and the graph node matching the query node are stored in storage space (S), set, to a first preset value, a dynamic reduction parameter used to control a quantity of graph nodes in an access sequence, and then, store the start query node and the start graph node into S, that is, store (Michael, michael) into S.

(2) Obtain (Michael, michael) buffered in S.

(3) Determine that the start graph node michael is not added to $G_Q$, and update $G_Q$, that is, add michael to $G_Q$.

(4) Dynamically calculate access costs of neighboring to-be-queried graph nodes of the query node Michael and the graph node michael, filter out a second to-be-queried graph node according to a first access cost, and determine an access sequence from a remaining to-be-queried graph node according to the dynamic reduction parameter. That is, the neighboring to-be-queried graph nodes (the neighboring to-be-queried graph nodes are $hg_1$, $hg_2$, $hg_m$, $cc_1$, $cc_2$, and $cc_3$) of the start graph node michael in the graph data set are queried according to a topology structure (the topology structure is that neighboring query nodes of Michael are HG and CC) of the query node Michael in the query topology structure, the access costs of the neighboring to-be-queried graph nodes of michael are calculated, and it is determined that respective access costs of $hg_m$, $cc_1$, and $cc_2$ do not exceed the preset first access cost. Therefore, the computer obtains the access sequence (HG, $hg_m$), (CC, $cc_1$), and (CC, $cc_2$) with reference to the dynamic reduction parameter, and successively stores the node pairs into S. That is, in this case, specific content in S may be shown in Table 1. The neighboring to-be-queried graph nodes in the node pairs in the access sequence are nodes that can be used to precisely find the first to-be-queried graph node.

TABLE 1

(HG, $hg_m$)
(CC, $cc_1$)
(CC, $cc_2$)

(5) Therefore, the computer determines that S is not empty, and the computer continues to obtain a to-be-queried graph node in S. In this case, $G_Q$ includes michael.

Step B: After step (5) in the foregoing step A, the computer continues to perform the following process.

(1) Obtain (HG, $hg_m$) buffered in S.

(2) Determine that $hg_m$ is not added to $G_Q$, and update $G_Q$, that is, add $hg_m$ to $G_Q$.

(3) Dynamically calculate access costs of neighboring to-be-queried graph nodes of the query node HG and the graph node $hg_m$, filter out a second to-be-queried graph node according to a first access cost, and determine an access sequence from a remaining to-be-queried graph node according to the dynamic reduction parameter. That is, the neighboring to-be-queried graph nodes (the neighboring to-be-queried graph nodes are $cl_n$ and $cl_{n-1}$) of the graph node $hg_m$ in the graph data are queried according to a topology structure (the topology structure is that a neighboring query node of HG is CL) of the query node HG in the query topology structure, and it is learned by means of calculation that the access costs of the neighboring to-be-queried graph nodes of $hg_m$ do not exceed the preset first access cost. Therefore, the computer obtains the access sequence (CL, $cl_n$) and (CL, $cl_{n-1}$) with reference to the dynamic reduction parameter, and stores the two node pairs into S. In this case, specific content in S may be shown in Table 2.

TABLE 2

| (CL, $cl_{n-1}$) |
|---|
| (CL, $cl_n$) |
| (CC, $cc_1$) |
| (CC, $cc_2$) |

(4) Therefore, the computer determines that S is not empty, and the computer continues to obtain a to-be-queried graph node in S. In this case, $G_Q$ includes michael and $hg_m$.

Step C: After step (4) in the foregoing step B, the computer continues to perform the following process.

(1) Obtain (CL, $cl_{n-1}$) buffered in S.

(2) Determine that $cl_{n-1}$ is not added to $G_Q$, and update $G_Q$, that is, add $cl_{n-1}$ to $G_Q$.

(3) Dynamically calculate access costs of neighboring to-be-queried graph nodes of the query node CL and the graph node $cl_{n-1}$, filter out a second to-be-queried graph node according to a first access cost, and determine an access sequence from a remaining to-be-queried graph node according to the dynamic reduction parameter. That is, the neighboring to-be-queried graph node of the graph node $cl_{n-1}$ in the graph data is queried according to a topology structure (a neighboring query node of CL is empty) of the query node CL in the query topology structure. Because $cl_{n-1}$ has no neighboring to-be-queried graph node, the computer determines that the access sequence is empty. In this case, specific content in S may be shown in Table 3.

TABLE 3

| (CL, $cl_n$) |
|---|
| (CC, $cc_1$) |
| (CC, $cc_2$) |

(4) Therefore, the computer determines that S is not empty, and the computer continues to obtain a to-be-queried graph node in S. In this case, $G_Q$ includes michael, $hg_m$, and $cl_{n-1}$.

Step D: After step (4) in the foregoing step C, the computer continues to perform the following process.

(1) Obtain (CL, $cl_n$) buffered in S.

(2) Determine that $cl_n$ is not added to $G_Q$, and update $G_Q$, that is, add $cl_n$ to $G_Q$.

(3) Dynamically calculate access costs of neighboring to-be-queried graph nodes of the query node CL and the graph node $cl_n$, filter out a second to-be-queried graph node according to a first access cost, and determine an access sequence from a remaining to-be-queried graph node according to the dynamic reduction parameter. That is, the neighboring to-be-queried graph node of the graph node $cl_n$ in the graph data is queried according to a topology structure (the neighboring query node of CL is empty) of the query node CL in the query topology structure. Because $cl_n$ has no neighboring to-be-queried graph node, the computer determines that the access sequence is empty. In this case, specific content in S may be shown in Table 4.

TABLE 4

| (CC, $cc_1$) |
|---|
| (CC, $cc_2$) |

(4) Therefore, the computer determines that S is not empty, and the computer continues to obtain a to-be-queried graph node in S. In this case, $G_Q$ includes michael, $hg_m$, $cl_{n-1}$, and $cl_n$.

Step E: After step (4) in the foregoing step D, the computer continues to perform the following process.

(1) Obtain (CC, $cc_1$) buffered in S.

(2) Determine that $cc_1$ is not added to $G_Q$, and update $G_Q$, that is, add $cc_1$ to $G_Q$.

(3) Dynamically calculate access costs of neighboring to-be-queried graph nodes of the query node CC and the graph node $cc_1$, filter out a second to-be-queried graph node according to a first access cost, and determine an access sequence from a remaining to-be-queried graph node according to the dynamic reduction parameter. That is, the neighboring to-be-queried graph nodes (the neighboring to-be-queried graph nodes are $cl_n$ and $cl_{n-1}$) of the graph node cc1 in the graph data set are queried according to a topology structure (the topology structure is that a neighboring query node of CC is CL) of the query node CC in the query topology structure, and it is learned by means of calculation that the access costs of the neighboring to-be-queried graph nodes of $cc_1$ do not exceed the preset first access cost. Therefore, the computer obtains the access sequence (CL, $cl_n$) and (CL, $cl_{n-1}$) with reference to the dynamic reduction parameter, and stores the two node pairs into S. In this case, specific content in S may be shown in Table 5.

TABLE 5

| (CL, $cl_{n-1}$) |
|---|
| (CL, $cl_n$) |
| (CC, $cc_2$) |

(4) Therefore, the computer determines that S is not empty, and the computer continues to obtain a to-be-queried graph node in S. In this case, GQ includes michael, $hg_m$, $cl_{n-1}$, $cl_n$, and $cc_1$.

Step F: After step (4) in the foregoing step E, the computer continues to perform the following process.

(1) Obtain (CL, $cl_{n-1}$) buffered in S.

(2) Determine that $cl_{n-1}$ has been added to $G_Q$, and mark $G_Q$ unchanged.

(3) Dynamically calculate the access costs of the neighboring to-be-queried graph nodes of the query node CL and the graph node $cl_{n-1}$, filter out a second to-be-queried graph node according to a first access cost, and determine an access sequence from a remaining to-be-queried graph node according to the dynamic reduction parameter. That is, the neighboring to-be-queried graph node of the graph node $cl_{n-1}$ in the graph data set is queried according to the topology structure of the query node CL in the query topology structure. Because $cl_{n-1}$ has no neighboring to-be-queried graph node, the computer determines that the access sequence is empty. In this case, specific content in S may be shown in Table 6.

TABLE 6

| (CL, $cl_n$) |
|---|
| (CC, $cc_2$) |

(4) Therefore, the computer determines that S is not empty, and the computer continues to obtain a to-be-queried graph node in S. In this case, GQ includes michael, $hg_m$, $cl_{n-1}$, $cl_n$, and $cc_1$.

Step G: After step (4) in the foregoing step F, the computer continues to perform the following process.

(1) Obtain (CL, $cl_n$) buffered in S.

(2) Determine that cln has been added to $G_Q$, and mark $G_Q$ unchanged.

(3) Dynamically calculate the access costs of the neighboring to-be-queried graph nodes of the query node CL and the graph node $cl_n$, filter out a second to-be-queried graph node according to a first access cost, and determine an access sequence from a remaining to-be-queried graph node according to the dynamic reduction parameter. That is, the neighboring graph node of the graph node $cl_n$ in the graph data set is queried according to the topology structure (the neighboring query node of CL is empty) of the query node CL in the query topology structure. Because $cl_n$ has no neighboring to-be-queried graph node, the computer determines that the access sequence is empty. In this case, specific content in S may be shown in Table 7.

TABLE 7

| (CC, $cc_2$) |
| --- |

(4) Therefore, the computer determines that S is not empty, and the computer continues to obtain a to-be-queried graph node in S. In this case, GQ includes michael, $hg_m$, $cl_{n-1}$, $cl_n$, and $cc_1$.

Step H: After step (4) in the foregoing step G, the computer continues to perform the following process.

(1) Obtain (CC, $cc_2$) buffered in S.

(2) Determine that $cc_2$ is not added to $G_Q$, and update $G_Q$, that is, add $cc_2$ to $G_Q$.

(3) Dynamically calculate access costs of neighboring to-be-queried graph nodes of the query node CC and the graph node $cc_2$, filter out a second to-be-queried graph node according to a first access cost, and determine an access sequence from a remaining to-be-queried graph node according to the dynamic reduction parameter. That is, the neighboring to-be-queried graph node (the neighboring to-be-queried graph node is $cl_n$) of the graph node $cc_2$ in the graph data set is queried according to the topology structure (the topology structure is that the neighboring query node of CC is CL) of the query node CC in the query topology structure, and it is learned by means of calculation that the access cost of the neighboring to-be-queried graph node of $cc_2$ does not exceed the preset first access cost. Therefore, the computer obtains the access sequence (CL, $cl_n$) with reference to the dynamic reduction parameter, and stores the node pair into S. In this case, specific content in S may be shown in Table 8.

TABLE 8

| (CL, $cl_n$) |
| --- |

(4) Therefore, the computer determines that S is not empty, and the computer continues to obtain a to-be-queried graph node in S. In this case, GQ includes michael, $hg_m$, $cl_{n-1}$, $cl_n$, $cc_1$, and $cc_2$.

Step I: After step (4) in the foregoing step H, the computer continues to perform the following process.

(1) Obtain (CL, $cl_n$) buffered in S.

(2) Determine that $cl_n$ has been added to $G_Q$, and mark $G_Q$ unchanged.

(3) Dynamically calculate the access costs of the neighboring to-be-queried graph nodes of the query node CL and the graph node $cl_n$, filter out a second to-be-queried graph node according to a first access cost, and determine an access sequence from a remaining to-be-queried graph node according to the dynamic reduction parameter. That is, the neighboring to-be-queried graph node of the graph node $cl_n$ in the graph data is queried according to the topology structure (the neighboring query node of CL is empty) of the query node CL in the query topology structure. Because $cl_n$ has no neighboring to-be-queried graph node, the computer determines that the access sequence is empty. In this case, S is empty.

(4) Therefore, the computer determines that S is empty, and in this case, $G_Q$ includes michael, $hg_m$, $cl_{n-1}$, $cl_n$, $cc_1$, and $cc_2$.

(5) Determine whether $G_Q$ changes, and because it can be learned from the foregoing step H and step I that $G_Q$ does not change, end the calculation, and determine that $G_Q$ includes michael, $hg_m$, $cl_{n-1}$, $cl_n$, $cc_1$, and $cc_2$, where michael is the start graph node in the $G_Q$, $cl_{n-1}$ and $cl_n$ are first to-be-queried graph nodes in the $G_Q$, $hg_m$, $cc_1$, and $cc_2$ are graph nodes that are in the $G_Q$ and that are in an association relationship between the start graph node and the first to-be-queried graph nodes.

(6) The computer determines the first to-be-queried graph nodes according to $G_Q$.

In the graph data search method provided in this embodiment of the present disclosure, a graph node that may be added to a reduction subgraph is determined from a graph data set according to a query topology structure, a preset first access cost, and an available resource condition in order to obtain the reduction subgraph, and a first to-be-queried graph node is further found using the reduction subgraph. In the method provided in this embodiment of the present disclosure, because a reduction subgraph is buffered in a memory of a computer, a result can be obtained by performing a query in the reduction subgraph in the memory, without a need to perform an IO operation such that graph data search efficiency of the computer is effectively improved. In addition, after completing one search, the computer releases a previously generated reduction subgraph, and during a next search, the computer searches for graph data again according to a new query request. That is, in this embodiment of the present disclosure, the computer generates a reduction subgraph in real time according to a query condition, and obtains a precise search result in real time according to the reduction subgraph. Therefore, the method provided in this embodiment of the present disclosure improves graph data search precision.

Figure 10:
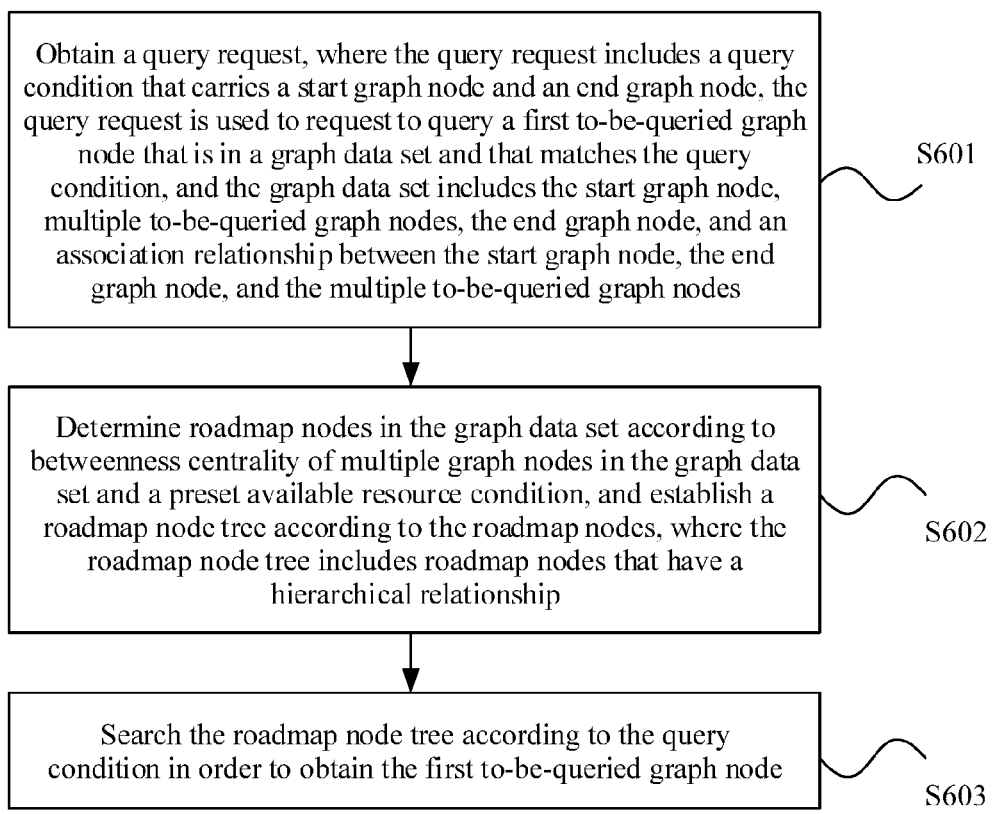
FIG. 10 is a schematic flowchart of Embodiment 6 of a graph data search method according to the present disclosure.

FIG. 10 is a schematic flowchart of Embodiment 6 of a graph data search method according to the present disclosure. The method involved in this embodiment of the present disclosure is still applicable to the foregoing distributed computing system shown in FIG. 1. In an example of this embodiment, a computer is still used as an execution body. A specific process in which the computer determines, using roadmap nodes in graph data, a first to-be-queried graph node that matches a query condition is involved in this embodiment. As shown in FIG. 10, the method includes the following steps.

Step S601: Obtain a query request, where the query request includes a query condition that carries a start graph node and an end graph node, the query request is used to request to query a first to-be-queried graph node that is in a graph data set and that matches the query condition, and the graph data set includes the start graph node, multiple to-be-queried graph nodes, the end graph node, and an association relationship between the start graph node, the end graph node, and the multiple to-be-queried graph nodes.

The computer obtains the query request of a user. Optionally, the query request may be configured by the user for the computer, or may be sent by the user to the computer using another device. The query request may include the query condition that carries the start graph node and the end graph node, and the query request is used to query the first to-be-queried graph node that is in the graph data set and that matches the query condition. It should be noted that, the association relationship in the graph data set refers to sides formed by the start graph node, the end graph node, and all the to-be-queried graph nodes. There may be one or more first to-be-queried graph nodes.

Figure 11:
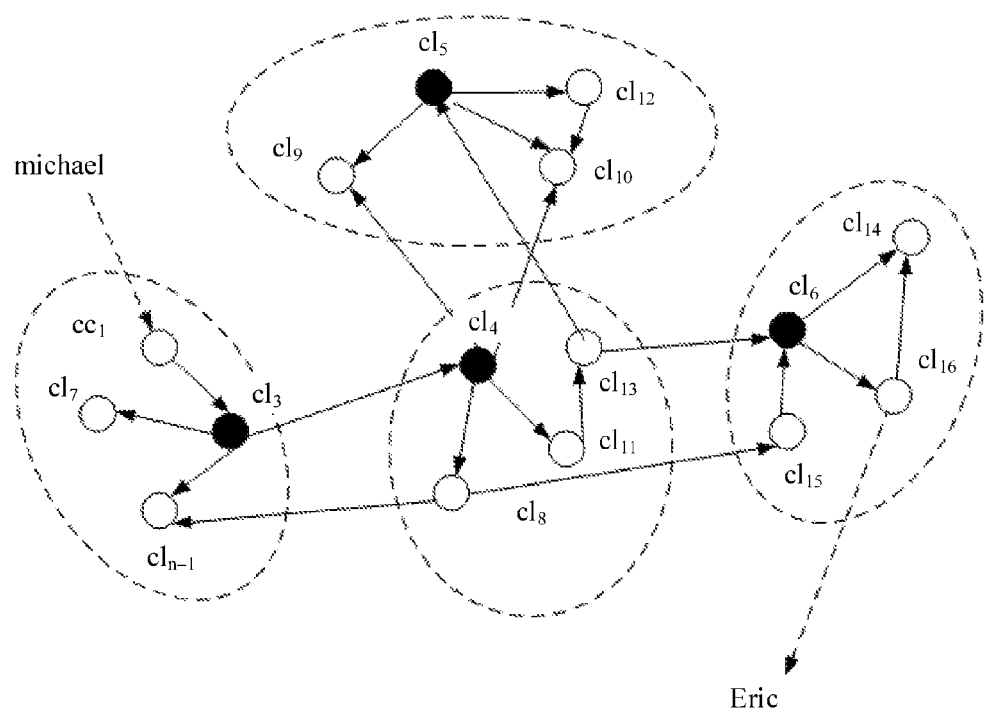
FIG. 11 is a second schematic diagram of a graph data set according to the present disclosure.

For example, referring to a graph data set shown in FIG. 11, it is assumed that a query condition in a query request is "can I have an acquaintance with a cyclist Eric through a friend". In FIG. 11, michael is a start graph node in the graph data, all graph nodes except michael are to-be-queried graph nodes, and Eric is an end graph node in the graph data. Connection lines that are between michael, Eric, and other to-be-queried graph nodes and that are shown in FIG. 11 are an association relationship between the start graph node and the to-be-queried graph nodes in the graph data.

Step S602: Determine roadmap nodes in the graph data set according to betweenness centrality of multiple graph nodes in the graph data set and a preset available resource condition, and establish a roadmap node tree according to the roadmap nodes, where the roadmap node tree includes roadmap nodes that have a hierarchical relationship.

The computer determines betweenness centrality of each graph node according to an association relationship between all the graph nodes (including the start graph node, the end graph node, and the to-be-queried graph nodes) in the graph data set, and determines the roadmap nodes in the graph data set according to the betweenness centrality of each graph node and the preset available resource condition. That is, the roadmap node is a node located in multiple shortest paths of other graph nodes.

Figure 12:
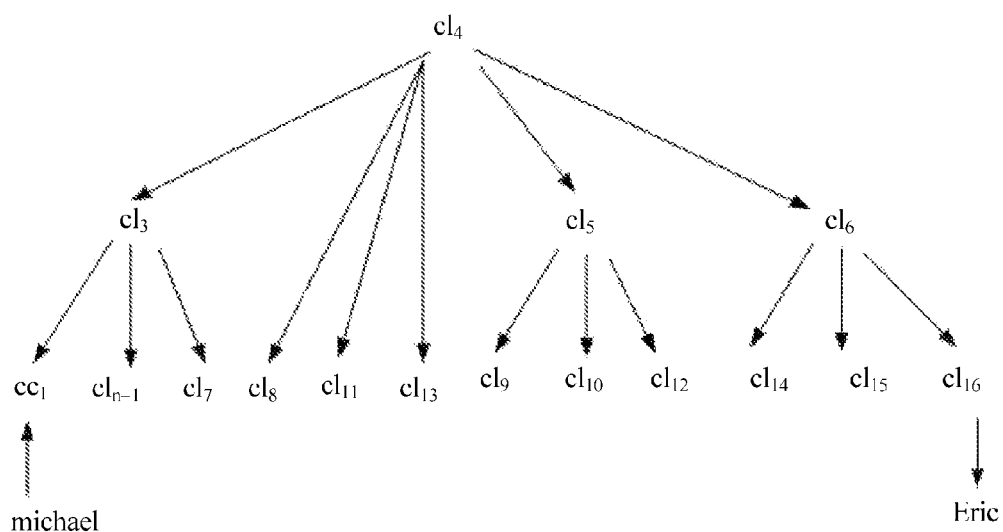
FIG. 12 is a schematic diagram of a roadmap node tree according to the present disclosure.

After determining the roadmap nodes in the graph data set, the computer establishes the roadmap node tree according to betweenness centrality of each roadmap node and the association relationship in the graph data set. The roadmap node tree includes multiple roadmap nodes that have a hierarchical relationship. For example, in the foregoing example used in FIG. 11, $cl_3$, $cl_4$, $cl_5$, and $cl_6$ are roadmap nodes, and $cl_4$ has largest betweenness centrality, and is used as a core roadmap node. Then, the computer establishes a roadmap node tree according to the association relationship between the graph nodes in the graph data set using the determined four roadmap nodes. Further, if a roadmap node b is reachable from a roadmap node a or a is reachable from b, a side (b, a) may be constructed and added to the roadmap node tree. The roadmap node tree may be shown in FIG. 12. The roadmap node tree includes other nodes in the graph data set in addition to the roadmap nodes.

It should be noted that, the preset available resource condition is used to constrain a size of a resource occupied by the roadmap node tree, that is, the resource occupied by the constructed roadmap node tree cannot exceed the preset available resource condition.

Step S603: Search the roadmap node tree according to the query condition in order to obtain the first to-be-queried graph node.

Still referring to the foregoing example used in FIG. 11, when the computer learns the start graph node in the query condition and learns the end graph node in the graph data set, the computer may search the association relationship in the roadmap node tree according to the query condition in order to determine whether the end graph node is reachable from the start graph node, and when the end graph node is reachable from the start graph node, output roadmap nodes passed through in a path in which the end graph node Eric is reachable from the start graph node. These roadmap nodes are first to-be-queried graph nodes. With reference to the foregoing examples shown in FIG. 11 and FIG. 12, the first to-be-queried graph node determined by the computer may be $cl_3$, $cl_4$, and $cl_6$.

In the graph data search method provided in this embodiment of the present disclosure, roadmap nodes are determined according to betweenness centrality of graph nodes in a graph data set and a preset available resource condition, a roadmap node tree is established, and then, the roadmap node tree is searched according to a query condition in order to determine a first to-be-queried graph node that meets the query condition. Because a roadmap node tree is used in a process of searching for a first to-be-queried graph node, paths and graph nodes that are passed through during a search for the first to-be-queried graph node are direct and effective paths and graph nodes. Therefore, an invalid search for obtaining the first to-be-queried graph node by a computer is avoided, time resources of the computer are reduced, and search efficiency is improved.

Figure 13:
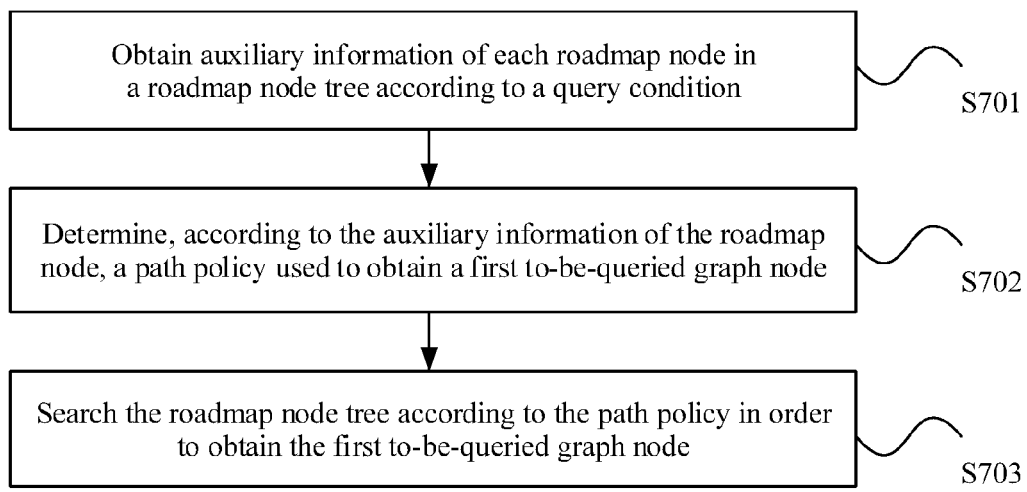
FIG. 13 is a schematic flowchart of Embodiment 7 of a graph data search method according to the present disclosure.

FIG. 13 is a schematic flowchart of Embodiment 7 of a graph data search method according to the present disclosure. On the basis of the foregoing embodiment shown in FIG. 10, a specific process in which the computer searches the roadmap node tree according to the query condition in order to obtain the first to-be-queried graph node is involved in this embodiment. As shown in FIG. 13, the foregoing step S603 includes the following steps.

Step S701: Obtain auxiliary information of each roadmap node in the roadmap node tree according to the query condition.

After constructing the roadmap node tree, the computer obtains the auxiliary information of each roadmap node in the roadmap node tree according to the query condition. Optionally, the auxiliary information may be whether the end graph node is reachable from the roadmap node, or may be an access cost or a consumed search time for reaching the end graph node from the roadmap node, or may be a size of a resource occupied by the roadmap node, or may be other information for assisting the computer in obtaining the first to-be-queried graph node.

Step S702: Determine, according to the auxiliary information of the roadmap node, a path policy used to obtain the first to-be-queried graph node.

Optionally, the path policy may be used to assist the computer in selecting an optimal path for obtaining the first to-be-queried graph node, or indicate, to the computer, a path that is in the roadmap node tree and in which the end graph node is not reachable from the start graph node.

Step S703: Search the roadmap node tree according to the path policy in order to obtain the first to-be-queried graph node.

In the graph data search method provided in this embodiment of the present disclosure, roadmap nodes are determined according to betweenness centrality of graph nodes in a graph data set and a preset available resource condition, a roadmap node tree is established, and then, the roadmap node tree is searched according to a query condition in order to determine a first to-be-queried graph node that meets the query condition. Because a roadmap node tree is used in a process of searching for a first to-be-queried graph node, paths and graph nodes that are passed through during a search for the first to-be-queried graph node are direct and effective paths and graph nodes. Therefore, an invalid search for obtaining the first to-be-queried graph node by a computer is avoided, time resources of the computer are reduced, and search efficiency is improved.

Persons of ordinary skill in the art may understand that all or some of the steps in the method embodiments may be implemented by a program instructing relevant hardware. The program may be stored in a computer-readable storage medium. When the program runs, the steps in the method embodiments are performed. The storage medium includes any medium that can store program code, such as a read-only memory (ROM), a random access memory (RAM), a magnetic disk, or an optical disc.

Figure 14:
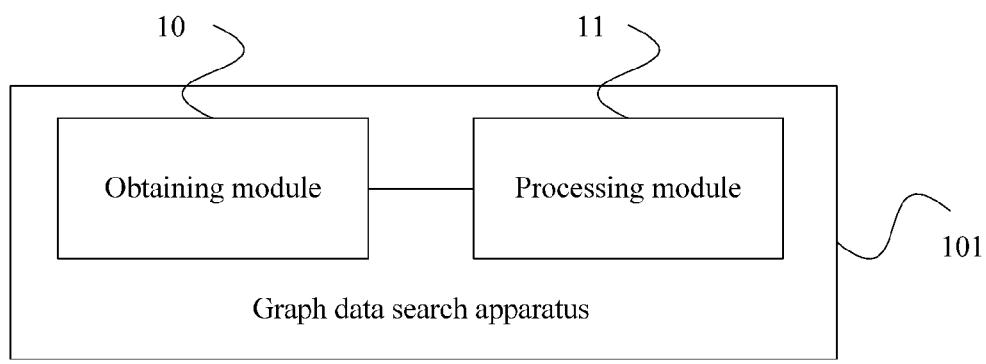
FIG. 14 is a schematic structural diagram of Embodiment 1 of a graph data search apparatus according to an embodiment of the present disclosure.

FIG. 14 is a schematic structural diagram of Embodiment 1 of a graph data search apparatus 101 according to an embodiment of the present disclosure. The graph data search apparatus 101 may be integrated into a computing node in the foregoing distributed computing system. As shown in FIG. 14, the apparatus includes an obtaining module 10 and a processing module 11.

The obtaining module 10 is configured to obtain a query request, where the query request includes a query condition that carries a start graph node, the query request is used to query a first to-be-queried graph node that is in a graph data set and that matches the query condition, and the graph data set includes the start graph node, multiple to-be-queried graph nodes, an association relationship between the start graph node and the multiple to-be-queried graph nodes, and an association relationship between each to-be-queried graph node and another to-be-queried graph node in the multiple to-be-queried graph nodes. The processing module 11 is configured to filter out, according to the query condition and a preset available resource condition, a second to-be-queried graph node that is in the graph data set and that does not meet the query condition and an association relationship that is in the graph data set and that includes the second to-be-queried graph node in order to obtain a reduction subgraph, and perform a query in the reduction subgraph using the query condition in order to obtain the first to-be-queried graph node, where the reduction subgraph includes the start graph node, the first to-be-queried graph node that matches the query condition, and an association relationship between the start graph node and the first to-be-queried graph node.

For the graph data search apparatus 101 provided in the present disclosure, refer to the foregoing method embodiment. An implementation principle and a technical effect of the graph data search apparatus 101 are similar to those of the foregoing method embodiment, and details are not described herein again.

The processing module 11 is further configured to generate a query topology structure according to the query condition, and filter out, according to a query topology relationship between query nodes in the query topology structure, a preset first access cost of accessing the first to-be-queried graph node, and the available resource condition, the second to-be-queried graph node that is in the graph data set and whose access cost exceeds the first access cost and the association relationship that is in the graph data set and that includes the second to-be-queried graph node in order to obtain the reduction subgraph, where the query topology structure includes multiple query nodes and the query topology relationship between each query node and another query node in the multiple query nodes, and a resource occupied by the reduction subgraph does not exceed the available resource condition.

The processing module 11 is further configured to read a query node and a graph node matching the query node that are stored in storage space, determine whether the reduction subgraph includes the read graph node, if the reduction subgraph does not include the read graph node, add the read graph node to the reduction subgraph, determine that the resource occupied by the reduction subgraph does not exceed the available resource condition, calculate an access cost of a to-be-queried graph node adjacent to the read graph node, filter out the second to-be-queried graph node whose access cost exceeds the first access cost and the association relationship that includes the second to-be-queried graph node whose access cost exceeds the first access cost, according to the query topology relationship between the query nodes in the query topology structure, and output, according to a preset dynamic reduction parameter, an access sequence that is to be stored into the storage space, where a query node in the query topology structure and a graph node matching the query node are stored in the storage space, the query node includes a start query node, the graph node includes the start graph node or the to-be-queried graph node, the start graph node matches the start query node, an access cost of a to-be-queried graph node in the access sequence does not exceed the first access cost, and the dynamic reduction parameter is used to control a quantity of to-be-queried graph nodes in the access sequence.

For the graph data search apparatus 101 provided in the present disclosure, refer to the foregoing method embodiment. An implementation principle and a technical effect of the graph data search apparatus 101 are similar to those of the foregoing method embodiment, and details are not described herein again.

Optionally, on the basis of the foregoing embodiment, the processing module 11 is further configured to set a quantity of graph nodes in the reduction subgraph to 0, set a quantity of query nodes and a quantity of graph nodes matching the query nodes to 0, where the query node and the graph node matching the query node are stored in storage space, set a dynamic reduction parameter to a first preset value, store a start query node in the query topology structure and the start graph node into the storage space, read the query node and the graph node matching the query node that are stored in the storage space, determine whether the reduction subgraph includes the read graph node, add the read graph node to the reduction subgraph if the reduction subgraph does not include the read graph node, determine that the resource occupied by the reduction subgraph does not exceed the available resource condition, calculate an access cost of a to-be-queried graph node adjacent to the read graph node, filter out the second to-be-queried graph node whose access cost exceeds the first access cost and the association relationship that includes the second to-be-queried graph node whose access cost exceeds the first access cost, according to the query topology relationship between the query nodes in the query topology structure, output, according to the dynamic reduction parameter, an access sequence that is to be stored into the storage space, determine whether the storage space is empty, continue to read the query node and the graph node matching the query node that are stored in the storage space, until the quantity of query nodes and the quantity of graph nodes matching the query nodes are 0 if the storage space is not empty, where the query node and the graph node matching the query node are stored in the storage space, or determine whether the reduction subgraph changes if the storage space is empty, and end the calculation in order to obtain the reduction subgraph when the reduction subgraph does not change, where the start graph node matches the start query node, the read graph node includes the start graph node or the to-be-queried graph node, an access cost of a to-be-queried graph node in the access sequence does not exceed the first access cost, and the dynamic reduction parameter is used to control a quantity of to-be-queried graph nodes in the access sequence.

Optionally, on the basis of the foregoing embodiment, the processing module 11 is further configured to set a quantity of graph nodes in the reduction subgraph to 0, set a quantity of query nodes and a quantity of graph nodes matching the query nodes to 0, where the query node and the graph node matching the query node are stored in storage space, and set a dynamic reduction parameter to a first preset value, store a start query node in the query topology structure and the start graph node into the storage space, read the query node and the graph node matching the query node that are stored in the storage space, mark the read query node and the read graph node matching the query node that are in the storage space, determine whether the reduction subgraph includes the read graph node, add the read graph node to the reduction subgraph if the reduction subgraph does not include the read graph node, determine that the resource occupied by the reduction subgraph does not exceed the available resource condition, calculate an access cost of a to-be-queried graph node adjacent to the read graph node, filter out the second to-be-queried graph node whose access cost exceeds the first access cost and the association relationship that includes the second to-be-queried graph node whose access cost exceeds the first access cost, according to the query topology relationship between the query nodes in the query topology structure, output, according to the dynamic reduction parameter, an access sequence that is to be stored into the storage space, determine whether an unmarked query node and a graph node matching the unmarked query node exist in the storage space, continue to read the query node and the graph node matching the query node that are stored in the storage space, until the query node and the graph node matching the query node that are stored in the storage space are marked if an unmarked query node and a graph node matching the unmarked query node exist in the storage space, or determine whether the reduction subgraph changes if the query node and the graph node matching the query node that are stored in the storage space are marked, and end the calculation in order to obtain the reduction subgraph when the reduction subgraph does not change, where the start graph node matches the start query node, the read graph node includes the start graph node or the to-be-queried graph node, an access cost of a to-be-queried graph node in the access sequence does not exceed the first access cost, and the dynamic reduction parameter is used to control a quantity of to-be-queried graph nodes in the access sequence.

The processing module 11 is further configured to store the start query node in the query node and the start graph node into the storage space again if the reduction subgraph changes, and adjust a value of the dynamic reduction parameter to a second preset value, and continue to read the query node and the graph node matching the query node that are stored in the storage space, until the quantity of query nodes and the quantity of graph nodes matching the query nodes are 0, where the query node and the graph node matching the query node are stored in the storage space, or until the query node and the graph node matching the query node that are stored in the storage space are marked.

The processing module 11 is further configured to end the calculation in order to obtain the reduction subgraph if the resource occupied by the reduction subgraph exceeds the available resource condition.

For the graph data search apparatus 101 provided in the present disclosure, refer to the foregoing method embodiment. An implementation principle and a technical effect of the graph data search apparatus 101 are similar to those of the foregoing method embodiment, and details are not described herein again.

Figure 15:
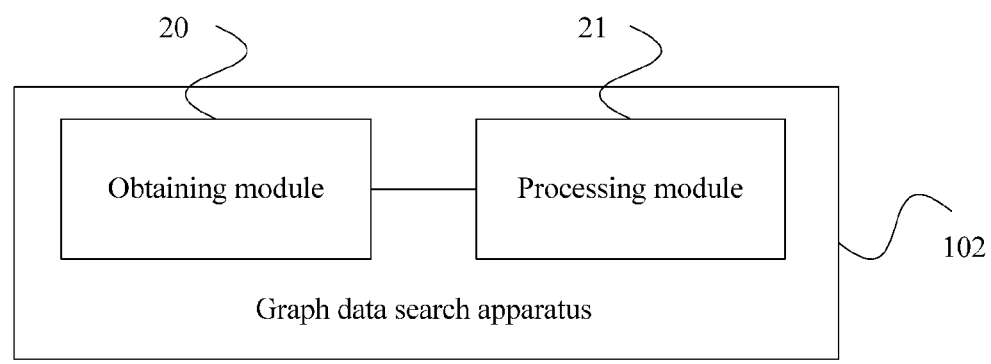
FIG. 15 is a schematic structural diagram of Embodiment 2 of a graph data search apparatus according to an embodiment of the present disclosure.

FIG. 15 is a schematic structural diagram of Embodiment 2 of a graph data search apparatus 102 according to an embodiment of the present disclosure. The graph data search apparatus 102 may be integrated into a computing node in the foregoing distributed computing system shown in FIG. 1. As shown in FIG. 15, the graph data search apparatus 102 includes an obtaining module 20 and a processing module 21.

The obtaining module 20 is configured to obtain a query request, where the query request includes a query condition that carries a start graph node and an end graph node, the query request is used to request to query a first to-be-queried graph node that is in a graph data set and that matches the query condition, and the graph data set includes the start graph node, multiple to-be-queried graph nodes, the end graph node, and an association relationship between the start graph node, the end graph node, and the multiple to-be-queried graph nodes. The processing module 21 is configured to determine roadmap nodes in the graph data set according to betweenness centrality of multiple graph nodes in the graph data set and a preset available resource condition, and establish a roadmap node tree according to the roadmap nodes, and search the roadmap node tree according to the query condition in order to obtain the first to-be-queried graph node, where the roadmap node tree includes roadmap nodes that have a hierarchical relationship.

For the graph data search apparatus 102 provided in the present disclosure, refer to the foregoing method embodiment. An implementation principle and a technical effect of the graph data search apparatus 102 are similar to those of the foregoing method embodiment, and details are not described herein again.

The processing module 21 is further configured to obtain auxiliary information of each roadmap node in the roadmap node tree according to the query condition, determine, according to the auxiliary information of the roadmap node, a path policy used to obtain the first to-be-queried graph node, and then, search the roadmap node tree according to the path policy in order to obtain the first to-be-queried graph node.

Figure 16:
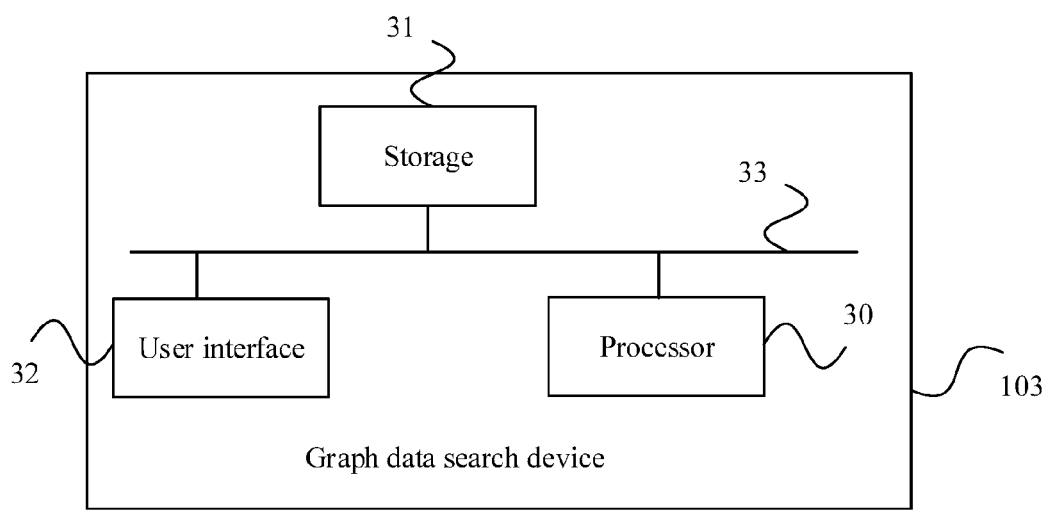
FIG. 16 is a schematic structural diagram of Embodiment 1 of a graph data search device according to an embodiment of the present disclosure.

FIG. 16 is a schematic structural diagram of Embodiment 1 of a graph data search device 103 according to an embodiment of the present disclosure. The graph data search device 103 may be a computing node in the foregoing distributed computing system shown in FIG. 1. As shown in FIG. 16, the device includes a processor 30, a storage 31, and a user interface 32, which are connected using a bus 33. Certainly, in addition, the graph data search device 103 provided in this embodiment of the present disclosure may further include a communications interface used for communication with another device, and the like. The graph data search device 103 shown in FIG. 16 may be an electronic device such as a mobile phone, a tablet computer, a desktop computer, a portable computer, or a server.

The bus 33 is configured to implement connection communication between the processor 30, the storage 31, and the user interface 32. The bus 33 may be an industry standard architecture (ISA) bus, a peripheral component interconnect (PCI) bus, an extended ISA (EISA) bus, or the like. The bus 33 may be one or more physical lines. When the bus 33 is multiple physical lines, the bus 33 may fall into the types, such as an address bus, a data bus, a control bus, and the like.

The user interface 32 is configured to receive an operation of a user or present a page to a user. For example, in this embodiment of the present disclosure, the graph data search device may obtain a query request using the user interface 32 such that the processor 30 executes a corresponding operation according to the query request.

The storage 31 is configured to store a computer program that may include an application program and an operating system program.

The processor 30 is configured to read the computer program from the storage 31, and is configured to execute the following operations, which are as follows. Obtaining a query request, where the query request includes a query condition that carries a start graph node, the query request is used to query a first to-be-queried graph node that is in a graph data set and that matches the query condition, and the graph data set includes the start graph node, multiple to-be-queried graph nodes, an association relationship between the start graph node and the multiple to-be-queried graph nodes, and an association relationship between each to-be-queried graph node and another to-be-queried graph node in the multiple to-be-queried graph nodes, filtering out, according to the query condition and a preset available resource condition, a second to-be-queried graph node that is in the graph data set and that does not meet the query condition and an association relationship that is in the graph data set and that includes the second to-be-queried graph node in order to obtain a reduction subgraph, where the reduction subgraph includes the start graph node, the first to-be-queried graph node that matches the query condition, and an association relationship between the start graph node and the first to-be-queried graph node, and performing a query in the reduction subgraph using the query condition in order to obtain the first to-be-queried graph node.

The processor 30 is further configured to generate a query topology structure according to the query condition, where the query topology structure includes multiple query nodes and a query topology relationship between each query node and another query node in the multiple query nodes, and filter out, according to the query topology relationship between the query nodes in the query topology structure, a preset first access cost of accessing the first to-be-queried graph node, and the available resource condition, the second to-be-queried graph node that is in the graph data set and whose access cost exceeds the first access cost and the association relationship that is in the graph data set and that includes the second to-be-queried graph node in order to obtain the reduction subgraph, where a resource occupied by the reduction subgraph does not exceed the available resource condition.

The processor 30 is further configured to read a query node and a graph node matching the query node that are stored in storage space, determine whether the reduction subgraph includes the read graph node, add the read graph node to the reduction subgraph if the reduction subgraph does not include the read graph node, determine that the resource occupied by the reduction subgraph does not exceed the available resource condition, calculate an access cost of a to-be-queried graph node adjacent to the read graph node, filter out the second to-be-queried graph node whose access cost exceeds the first access cost and the association relationship that includes the second to-be-queried graph node whose access cost exceeds the first access cost, according to the query topology relationship between the query nodes in the query topology structure, and output, according to a preset dynamic reduction parameter, an access sequence that is to be stored into the storage space, where a query node in the query topology structure and a graph node matching the query node are stored in the storage space, the query node includes a start query node, the graph node includes the start graph node or the to-be-queried graph node, the start graph node matches the start query node, an access cost of a to-be-queried graph node in the access sequence does not exceed the first access cost, and the dynamic reduction parameter is used to control a quantity of to-be-queried graph nodes in the access sequence.

Optionally, in a specific implementation manner of this embodiment of the present disclosure, the processor 30 is further configured to set a quantity of graph nodes in the reduction subgraph to 0, set a quantity of query nodes and a quantity of graph nodes matching the query nodes to 0, where the query node and the graph node matching the query node are stored in storage space, set a dynamic reduction parameter to a first preset value, store a start query node in the query topology structure and the start graph node into the storage space, read the query node and the graph node matching the query node that are stored in the storage space, determine whether the reduction subgraph includes the read graph node, add the read graph node to the reduction subgraph if the reduction subgraph does not include the read graph node, determine that the resource occupied by the reduction subgraph does not exceed the available resource condition, calculate an access cost of a to-be-queried graph node adjacent to the read graph node, and filter out the second to-be-queried graph node whose access cost exceeds the first access cost and the association relationship that includes the second to-be-queried graph node whose access cost exceeds the first access cost, according to the query topology relationship between the query nodes in the query topology structure, output, according to the dynamic reduction parameter, an access sequence that is to be stored into the storage space, determine whether the storage space is empty, continue to read the query node and the graph node matching the query node that are stored in the storage space, until the quantity of query nodes and the quantity of graph nodes matching the query nodes are 0 if the storage space is not empty, where the query node and the graph node matching the query node are stored in the storage space, or determine whether the reduction subgraph changes if the storage space is empty, and end the calculation in order to obtain the reduction subgraph when the reduction subgraph does not change, where the start graph node matches the start query node, the read graph node includes the start graph node or the to-be-queried graph node, an access cost of a to-be-queried graph node in the access sequence does not exceed the first access cost, and the dynamic reduction parameter is used to control a quantity of to-be-queried graph nodes in the access sequence.

Optionally, in another specific implementation manner of this embodiment of the present disclosure, the processor 30 is further configured to set a quantity of graph nodes in the reduction subgraph to 0, set a quantity of query nodes and a quantity of graph nodes matching the query nodes to 0, where the query node and the graph node matching the query node are stored in storage space, set a dynamic reduction parameter to a first preset value, store a start query node in the query topology structure and the start graph node into the storage space, read the query node and the graph node matching the query node that are stored in the storage space, mark the read query node and the read graph node matching the query node that are in the storage space, determine whether the reduction subgraph includes the read graph node, add the read graph node to the reduction subgraph if the reduction subgraph does not include the read graph node, determine that the resource occupied by the reduction subgraph does not exceed the available resource condition, calculate an access cost of a to-be-queried graph node adjacent to the read graph node, filter out the second to-be-queried graph node whose access cost exceeds the first access cost and the association relationship that includes the second to-be-queried graph node whose access cost exceeds the first access cost, according to the query topology relationship between the query nodes in the query topology structure, output, according to the dynamic reduction parameter, an access sequence that is to be stored into the storage space, determine whether an unmarked query node and a graph node matching the unmarked query node exist in the storage space, continue to read the query node and the graph node matching the query node that are stored in the storage space, until the query node and the graph node matching the query node that are stored in the storage space are marked if an unmarked query node and a graph node matching the unmarked query node exist in the storage space, or determine whether the reduction subgraph changes if the query node and the graph node matching the query node that are stored in the storage space are marked, and end the calculation in order to obtain the reduction subgraph when the reduction subgraph does not change, where the start graph node matches the start query node, the read graph node includes the start graph node or the to-be-queried graph node, an access cost of a to-be-queried graph node in the access sequence does not exceed the first access cost, and the dynamic reduction parameter is used to control a quantity of to-be-queried graph nodes in the access sequence.

The processor 30 is further configured to store the start query node in the query node and the start graph node into the storage space again if the reduction subgraph changes, adjust a value of the dynamic reduction parameter to a second preset value, and continue to read the query node and the graph node matching the query node that are stored in the storage space, until the quantity of query nodes and the quantity of graph nodes matching the query nodes are 0, where the query node and the graph node matching the query node are stored in the storage space, or until the query node and the graph node matching the query node that are stored in the storage space are marked.

The processor 30 is further configured to end the calculation in order to obtain the reduction subgraph if the resource occupied by the reduction subgraph exceeds the available resource condition.

The graph data search device 103 involved in this embodiment may execute the foregoing method embodiment. An included computer program may be divided according to a module form described in the foregoing apparatus embodiment, or may be divided in another module division manner, or a module may not be divided. For a specific implementation method and technical effect, refer to the foregoing method embodiment, and details are not described herein again.

Figure 17:
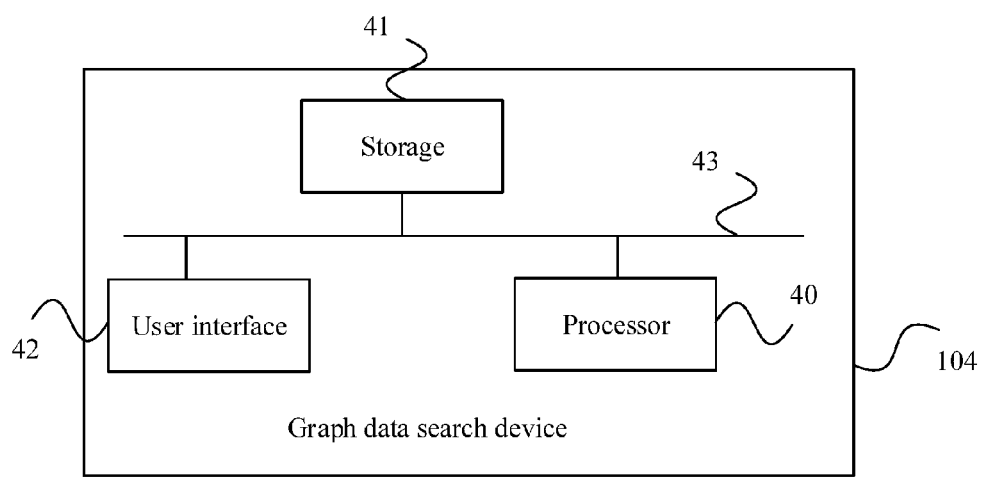
FIG. 17 is a schematic structural diagram of Embodiment 2 of a graph data search device according to an embodiment of the present disclosure.

FIG. 17 is a schematic structural diagram of Embodiment 2 of a graph data search device 104 according to an embodiment of the present disclosure. The graph data search device 104 may be a computing node in the foregoing distributed computing system. As shown in FIG. 17, the graph data search device 104 includes a processor 40, a storage 41, and a user interface 42, which are connected using a bus 43. Certainly, in addition, the graph data search device 104 provided in this embodiment of the present disclosure may further include a communications interface used for communication with another device, and the like. The graph data search device 104 shown in FIG. 17 may be an electronic device such as a mobile phone, a tablet computer, a desktop computer, a portable computer, or a server.

The bus 43 is configured to implement connection communication between the processor 40, the storage 41, and the user interface 42. The bus 43 may be an ISA bus, a PCI bus, an EISA bus, or the like. The bus 43 may be one or more physical lines. When the bus 43 is multiple physical lines, the bus 43 may fall into the types, such as an address bus, a data bus, a control bus, and the like.

The user interface 42 is configured to receive an operation of a user or present a page to a user. For example, in this embodiment of the present disclosure, the graph data search device 104 may obtain a query request using the user interface 42 such that the processor 40 executes a corresponding operation according to the query request.

The storage 41 is configured to store a computer program that may include an application program and an operating system program.

The processor 40 is configured to read the computer program from the storage 41, and is configured to execute the following operations, which are as follows: obtaining a query request, determining roadmap nodes in a graph data set according to betweenness centrality of multiple graph nodes in the graph data set and a preset available resource condition, establishing a roadmap node tree according to the roadmap nodes, and searching the roadmap node tree according to a query condition in order to obtain a first to-be-queried graph node, where the query request includes the query condition that carries a start graph node and an end graph node, the query request is used to request to query the first to-be-queried graph node that is in the graph data set and that matches the query condition, the graph data set includes the start graph node, multiple to-be-queried graph nodes, the end graph node, and an association relationship between the start graph node, the end graph node, and the multiple to-be-queried graph node, and the roadmap node tree includes roadmap nodes that have a hierarchical relationship.

The processor 40 is further configured to obtain auxiliary information of each roadmap node in the roadmap node tree according to the query condition, determine, according to the auxiliary information of the roadmap node, a path policy used to obtain the first to-be-queried graph node, and search the roadmap node tree according to the path policy in order to obtain the first to-be-queried graph node.

The graph data search device 104 involved in this embodiment may execute the foregoing method embodiment. An included computer program may be divided according to a module form described in the foregoing apparatus embodiment, or may be divided in another module division manner, or a module may not be divided. For a specific implementation method and technical effect, refer to the foregoing method embodiment, and details are not described herein again.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, as long as the modifications or replacements do not cause the essence of the corresponding technical solutions to depart from the scope of the technical solutions of the embodiments of the present disclosure.

What is claimed is:

1. A graph data search method, comprising:
obtaining a query request, wherein the query request comprises a query condition that carries a start graph node, wherein the query request queries a first to-be-queried graph node in a graph data set matching the query condition, and wherein the graph data set comprises the start graph node, a plurality of to-be-queried graph nodes, an association relationship between the start graph node and the plurality of to-be-queried graph nodes, and an association relationship between each to-be-queried graph node and another to-be-queried graph node in the plurality of to-be-queried graph nodes;
filtering out, according to the query condition and a preset available resource condition, a second to-be-queried graph node in the graph data set that does not meet the query condition and an association relationship in the graph data set comprising the second to-be-queried graph node in order to obtain a reduction subgraph, wherein the reduction subgraph comprises the start graph node, the first to-be-queried graph node matching the query condition, and an association relationship between the start graph node and the first to-be-queried graph node; and
performing a query in the reduction subgraph using the query condition to obtain the first to-be-queried graph node.

2. The method according to claim 1, wherein filtering out the second to-be-queried graph node in the graph data set and a corresponding association relationship to obtain the reduction subgraph comprises:
generating a query topology structure according to the query condition, wherein the query topology structure comprises a plurality of query nodes and a query topology relationship between each query node and another query node in the plurality of query nodes; and
filtering out, according to the query topology relationship between the query nodes in the query topology structure, a preset first access cost of accessing the first to-be-queried graph node, and the preset available resource condition, the second to-be-queried graph node in the graph data set whose access cost exceeds the preset first access cost and the association relationship in the graph data set comprising the second to-be-queried graph node in order to obtain the reduction subgraph, wherein a resource occupied by the reduction subgraph does not exceed the preset available resource condition.

3. The method according to claim 2, wherein filtering out the second to-be-queried graph node in the graph data set and the association relationship in the graph data set comprising the second to-be-queried graph node in order to obtain the reduction subgraph comprises:
reading a query node and a graph node matching the query node stored in storage space, wherein a query node in the query topology structure and a graph node matching the query node are stored in the storage space, wherein the query node comprises a start query node, wherein the graph node comprises the start graph node, and wherein the start graph node matches the start query node;
determining whether the reduction subgraph comprises the read graph node;
adding the read graph node to the reduction subgraph when the reduction subgraph does not comprise the read graph node;
determining that the resource occupied by the reduction subgraph does not exceed the available resource condition;
calculating an access cost of a to-be-queried graph node adjacent to the read graph node, and filtering out the second to-be-queried graph node whose access cost exceeds the first access cost and the association relationship comprising the second to-be-queried graph node whose access cost exceeds the first access cost, according to the query topology relationship between the query nodes in the query topology structure; and
outputting, according to a preset dynamic reduction parameter, an access sequence that is to be stored into the storage space, wherein an access cost of a to-be-queried graph node in the access sequence does not exceed the first access cost, and wherein the preset dynamic reduction parameter controls a quantity of to-be-queried graph nodes in the access sequence.

4. The method according to claim 2, wherein filtering out the second to-be-queried graph node in the graph data set and the association relationship in the graph data set comprising the second to-be-queried graph node in order to obtain the reduction subgraph comprises:
reading a query node and a graph node matching the query node stored in storage space, wherein a query node in the query topology structure and a graph node matching the query node are stored in the storage space, wherein the query node comprises a start query node, wherein the graph node comprises the to-be-queried graph node, and wherein the start graph node matches the start query node;
determining whether the reduction subgraph comprises the read graph node;
adding the read graph node to the reduction subgraph when the reduction subgraph does not comprise the read graph node;
determining that the resource occupied by the reduction subgraph does not exceed the available resource condition;
calculating an access cost of a to-be-queried graph node adjacent to the read graph node, and filtering out the second to-be-queried graph node whose access cost exceeds the first access cost and the association relationship comprising the second to-be-queried graph node whose access cost exceeds the first access cost, according to the query topology relationship between the query nodes in the query topology structure; and
outputting, according to a preset dynamic reduction parameter, an access sequence that is to be stored into the storage space, wherein an access cost of a to-be-queried graph node in the access sequence does not exceed the first access cost, and wherein the preset dynamic reduction parameter controls a quantity of to-be-queried graph nodes in the access sequence.

5. The method according to claim 2, wherein filtering out the second to-be-queried graph node and the association relationship comprising the second to-be-queried graph node in order to obtain the reduction subgraph comprises the following steps:

step A: setting a quantity of graph nodes in the reduction subgraph to 0, setting a quantity of query nodes and a quantity of graph nodes matching the query nodes to 0, wherein a query node and a graph node matching the query node are stored in storage space, and setting a dynamic reduction parameter to a first preset value;

step B: storing a start query node in the query topology structure and the start graph node into the storage space, wherein the start graph node matches the start query node;

step C: reading the query node and the graph node matching the query node stored in the storage space;

step D: determining whether the reduction subgraph comprises the read graph node, wherein the read graph node comprises the start graph node or the to-be-queried graph node;

step E: adding the read graph node to the reduction subgraph when the reduction subgraph does not comprise the read graph node, and determining that the resource occupied by the reduction subgraph does not exceed the preset available resource condition;

step F: calculating an access cost of a to-be-queried graph node adjacent to the read graph node, and filtering out the second to-be-queried graph node whose access cost exceeds the preset first access cost and the association relationship comprising the second to-be-queried graph node whose access cost exceeds the preset first access cost, according to the query topology relationship between the query nodes in the query topology structure, and outputting, according to the dynamic reduction parameter, an access sequence that is to be stored into the storage space, wherein an access cost of a to-be-queried graph node in the access sequence does not exceed the preset first access cost, and wherein the dynamic reduction parameter controls a quantity of to-be-queried graph nodes in the access sequence;

step G: determining whether the storage space is empty;

step H: performing step C again until the quantity of query nodes and the quantity of graph nodes matching the query nodes are 0 when the storage space is not empty, wherein the query node and the graph node matching the query node are stored in the storage space, and determining whether the reduction subgraph changes when the storage space is empty; and step I: ending the filtering out process in order to obtain the reduction subgraph when the reduction subgraph does not change.

6. The method according to claim 2, wherein filtering out the second to-be-queried graph node and the corresponding association relationship in order to obtain the reduction subgraph comprises the following steps:

step A: setting a quantity of graph nodes in the reduction subgraph to 0, setting a quantity of query nodes and a quantity of graph nodes matching the query nodes to 0, wherein a query node and a graph node matching the query node are stored in storage space, and setting a dynamic reduction parameter to a first preset value;

step B: storing a start query node in the query topology structure and the start graph node into the storage space, wherein the start graph node matches the start query node;

step C: reading the query node and the graph node matching the query node stored in the storage space, and marking the read query node and the read graph node matching the query node in the storage space;

step D: determining whether the reduction subgraph comprises the read graph node, wherein the read graph node comprises the start graph node or the to-be-queried graph node;

step E: adding the read graph node to the reduction subgraph when the reduction subgraph does not comprise the read graph node, and determining that the resource occupied by the preset reduction subgraph does not exceed the available resource condition;

step F: calculating an access cost of a to-be-queried graph node adjacent to the read graph node, and filtering out the second to-be-queried graph node whose access cost exceeds the preset first access cost and the association relationship comprising the second to-be-queried graph node whose access cost exceeds the preset first access cost, according to the query topology relationship between the query nodes in the query topology structure, and outputting, according to the dynamic reduction parameter, an access sequence that is to be stored into the storage space, wherein an access cost of a to-be-queried graph node in the access sequence does not exceed the preset first access cost, and wherein the dynamic reduction parameter controls a quantity of to-be-queried graph nodes in the access sequence;

step G: determining whether an unmarked query node and a graph node matching the unmarked query node exist in the storage space;

step H: performing step C again until the query node and the graph node matching the query node stored in the storage space are marked when the unmarked query node and the graph node matching the unmarked query node exist in the storage space, and determining whether the reduction subgraph changes when the query node and the graph node matching the query node stored in the storage space are marked; and step I: ending the filtering out process in order to obtain the reduction subgraph when the reduction subgraph does not change.

7. The method according to claim 6, wherein after determining whether the reduction subgraph changes, the method further comprises:

storing the start query node in the query node and the start graph node into the storage space again, and adjusting a value of the dynamic reduction parameter to a second preset value when the reduction subgraph changes; and performing step C.

8. The method according to claim 7, further comprising ending the filtering out process in order to obtain the reduction subgraph when the resource occupied by the reduction subgraph exceeds the preset available resource condition.

9. A graph data search method, comprising:

obtaining a query request, wherein the query request comprises a query condition that carries a start graph node and an end graph node, wherein the query request requests to query a first to-be-queried graph node in a graph data set matching the query condition, and wherein the graph data set comprises the start graph node, a plurality of to-be-queried graph nodes, the end graph node, and an association relationship between the start graph node, the end graph node, and the plurality of to-be-queried graph nodes;

determining roadmap nodes in the graph data set according to betweenness centrality of a plurality of graph nodes in the graph data set and a preset available resource condition;

establishing a roadmap node tree according to the roadmap nodes, wherein the roadmap node tree comprises roadmap nodes that have a hierarchical relationship; and searching the roadmap node tree according to the query condition to obtain the first to-be-queried graph node.

10. The method according to claim 9, wherein searching the roadmap node tree in order to obtain the first to-be-queried graph node comprises:

obtaining auxiliary information of each roadmap node in the roadmap node tree according to the query condition;

determining, according to the auxiliary information of the roadmap node, a path policy in order to obtain the first to-be-queried graph node; and searching the roadmap node tree according to the path policy in order to obtain the first to-be-queried graph node.

11. A graph data search apparatus, comprising:

a memory comprising instructions; and a processor coupled to the memory, wherein the instructions cause the processor to be configured to:

obtain a query request, wherein the query request comprises a query condition that carries a start graph node, wherein the query request queries a first to-be-queried graph node in a graph data set matching the query condition, and wherein the graph data set comprises the start graph node, a plurality of to-be-queried graph nodes, an association relationship between the start graph node and the plurality of to-be-queried graph nodes, and an association relationship between each to-be-queried graph node and another to-be-queried graph node in the plurality of to-be-queried graph nodes;

filter out, according to the query condition and a preset available resource condition, a second to-be-queried graph node in the graph data set that does not meet the query condition and an association relationship in the graph data set comprising the second to-be-queried graph node in order to obtain a reduction subgraph; and perform a query in the reduction subgraph using the query condition to obtain the first to-be-queried graph node, wherein the reduction subgraph comprises the start graph node, the first to-be-queried graph node that matches the query condition, and an association relationship between the start graph node and the first to-be-queried graph node.

12. The apparatus according to claim 11, wherein instructions further cause the processor to be configured to:

generate a query topology structure according to the query condition; and filter out, according to a query topology relationship between query nodes in the query topology structure, a preset first access cost of accessing the first to-be-queried graph node, and the preset available resource condition, the second to-be-queried graph node in the graph data set whose access cost exceeds the preset first access cost and the association relationship in the graph data set comprising the second to-be-queried graph node in order to obtain the reduction subgraph, wherein the query topology structure comprises a plurality of query nodes and the query topology relationship between each query node and another query node in the plurality of query nodes, and wherein a resource occupied by the reduction subgraph does not exceed the preset available resource condition.

13. The apparatus according to claim 12, wherein the instructions further cause the processor to be configured to:

read a query node and a graph node matching the query node stored in storage space;

determine whether the reduction subgraph comprises the read graph node;

add the read graph node to the reduction subgraph when the reduction subgraph does not comprise the read graph node;

determine that the resource occupied by the reduction subgraph does not exceed the available resource condition;

calculate an access cost of a to-be-queried graph node adjacent to the read graph node, and filter out the second to-be-queried graph node whose access cost exceeds the first access cost and the association relationship comprising the second to-be-queried graph node whose access cost exceeds the first access cost, according to the query topology relationship between the query nodes in the query topology structure; and output, according to a preset dynamic reduction parameter, an access sequence that is to be stored into the storage space, wherein a query node in the query topology structure and a graph node matching the query node are stored in the storage space, wherein the query node comprises a start query node, wherein the graph node comprises the start graph node, wherein the start graph node matches the start query node, wherein an access cost of a to-be-queried graph node in the access sequence does not exceed the preset first access cost, and wherein the preset dynamic reduction parameter controls a quantity of to-be-queried graph nodes in the access sequence.

14. The apparatus according to claim 12, wherein the instructions further cause the processor to be configured to:

read a query node and a graph node matching the query node stored in storage space;

determine whether the reduction subgraph comprises the read graph node;

add the read graph node to the reduction subgraph when the reduction subgraph does not comprise the read graph node;

determine that the resource occupied by the reduction subgraph does not exceed the available resource condition;

calculate an access cost of a to-be-queried graph node adjacent to the read graph node, and filter out the second to-be-queried graph node whose access cost exceeds the first access cost and the association relationship comprising the second to-be-queried graph node whose access cost exceeds the first access cost, according to the query topology relationship between the query nodes in the query topology structure; and output, according to a preset dynamic reduction parameter, an access sequence that is to be stored into the storage space, wherein a query node in the query topology structure and a graph node matching the query node are stored in the storage space, wherein the query node comprises a start query node, wherein the graph node comprises the to-be-queried graph node,
wherein the start graph node matches the start query node,
wherein an access cost of a to-be-queried graph node in the access sequence does not exceed the preset first access cost, and
wherein the preset dynamic reduction parameter controls a quantity of to-be-queried graph nodes in the access sequence.

15. The apparatus according to claim 12, wherein the instructions further cause the processor to be configured to:
set a quantity of graph nodes in the reduction subgraph to 0;
set a quantity of query nodes and a quantity of graph nodes matching the query nodes to 0,
wherein a query node and a graph node matching the query node are stored in storage space;
set a dynamic reduction parameter to a first preset value;
store a start query node in the query topology structure and the start graph node into the storage space;
read the query node and the graph node matching the query node stored in the storage space;
determine whether the reduction subgraph comprises the read graph node;
add the read graph node to the reduction subgraph when the reduction subgraph does not comprise the read graph node;
determine that the resource occupied by the reduction subgraph does not exceed the preset available resource condition;
calculate an access cost of a to-be-queried graph node adjacent to the read graph node, and filter out the second to-be-queried graph node whose access cost exceeds the preset first access cost and the association relationship comprising the second to-be-queried graph node whose access cost exceeds the first access cost, according to the query topology relationship between the query nodes in the query topology structure;
output, according to the dynamic reduction parameter, an access sequence that is to be stored into the storage space;
determine whether the storage space is empty;
continue to read the query node and the graph node matching the query node stored in the storage space, until the quantity of query nodes and the quantity of graph nodes matching the query nodes are 0 when the storage space is not empty, wherein the query node and the graph node matching the query node are stored in the storage space;
determine whether the reduction subgraph changes when the storage space is empty; and
end the filter out process in order to obtain the reduction subgraph when the reduction subgraph does not change,
wherein the start graph node matches the start query node,
wherein the read graph node comprises the start graph node or the to-be-queried graph node,
wherein an access cost of a to-be-queried graph node in the access sequence does not exceed the first access cost, and
wherein the dynamic reduction parameter controls a quantity of to-be-queried graph nodes in the access sequence.

16. The apparatus according to claim 12, wherein the instructions further cause the processor to be configured to:
set a quantity of graph nodes in the reduction subgraph to 0;
set a quantity of query nodes and a quantity of graph nodes matching the query nodes to 0,
wherein a query node and a graph node matching the query node are stored in storage space;
set a dynamic reduction parameter to a first preset value;
store a start query node in the query topology structure and the start graph node into the storage space;
read the query node and the graph node matching the query node stored in the storage space;
mark the read query node and the read graph node matching the query node in the storage space;
determine whether the reduction subgraph comprises the read graph node;
add the read graph node to the reduction subgraph when the reduction subgraph does not comprise the read graph node;
determine that the resource occupied by the reduction subgraph does not exceed the available resource condition;
calculate an access cost of a to-be-queried graph node adjacent to the read graph node, and filter out the second to-be-queried graph node whose access cost exceeds the preset first access cost and the association relationship comprising the second to-be-queried graph node whose access cost exceeds the preset first access cost, according to the query topology relationship between the query nodes in the query topology structure;
output, according to the dynamic reduction parameter, an access sequence that is to be stored into the storage space;
determine whether an unmarked query node and a graph node matching the unmarked query node exist in the storage space;
continue to read the query node and the graph node matching the query node stored in the storage space, until the query node and the graph node matching the query node stored in the storage space are marked when the unmarked query node and the graph node matching the unmarked query node exist in the storage space;
determine whether the reduction subgraph changes when the query node and the graph node matching the query node stored in the storage space are marked; and
end the filter out process in order to obtain the reduction subgraph when the reduction subgraph does not change,
wherein the start graph node matches the start query node,
wherein the read graph node comprises the start graph node or the to-be-queried graph node,
wherein an access cost of a to-be-queried graph node in the access sequence does not exceed the first access cost, and
wherein the dynamic reduction parameter controls a quantity of to-be-queried graph nodes in the access sequence.

17. The apparatus according to claim 16, wherein the instructions further cause the processor to be configured to:
store the start query node in the query node and the start graph node into the storage space again, and adjust a value of the dynamic reduction parameter to a second preset value when the reduction subgraph changes; and
continue to read the query node and the graph node matching the query node stored in the storage space, until the quantity of query nodes and the quantity of graph nodes matching the query nodes are 0, or until the query node and the graph node matching the query node that are stored in the storage space are marked.

18. The apparatus according to claim 17, wherein the instructions further cause the processor to be configured to end the filter out process in order to obtain the reduction subgraph when the resource occupied by the reduction subgraph exceeds the preset available resource condition.

19. A graph data search apparatus, comprising:

a memory comprising instructions; and a processor coupled to the memory, wherein the instructions cause the processor to be configured to:

obtain a query request, wherein the query request comprises a query condition that carries a start graph node and an end graph node, wherein the query request requests to query a first to-be-queried graph node in a graph data set matching the query condition, and wherein the graph data set comprises the start graph node, a plurality of to-be-queried graph nodes, the end graph node, and an association relationship between the start graph node, the end graph node, and the plurality of to-be-queried graph nodes;

determine roadmap nodes in the graph data set according to betweenness centrality of a plurality of graph nodes in the graph data set and a preset available resource condition;

establish a roadmap node tree according to the roadmap nodes; and search the roadmap node tree according to the query condition in order to obtain the first to-be-queried graph node, wherein the roadmap node tree comprises roadmap nodes that have a hierarchical relationship.

20. The apparatus according to claim 17, wherein the instructions further cause the processor to be configured to:

obtain auxiliary information of each roadmap node in the roadmap node tree according to the query condition;

determine, according to the auxiliary information of the roadmap node, a path policy in order to obtain the first to-be-queried graph node; and search the roadmap node tree according to the path policy in order to obtain the first to-be-queried graph node.

* * * * *